US009156025B2

(12) United States Patent
Qi et al.

(10) Patent No.: US 9,156,025 B2
(45) Date of Patent: Oct. 13, 2015

(54) THREE-WAY CATALYTIC CONVERTER USING NANOPARTICLES

(71) Applicant: SDCmaterials, Inc., Tempe, AZ (US)

(72) Inventors: Xiwang Qi, Scottsdale, AZ (US); Maximilian A. Biberger, Scottsdale, AZ (US)

(73) Assignee: SDCmaterials, Inc., Tempe, AZ (US)

( * ) Notice: Subject to any disclaimer, the term of this patent is extended or adjusted under 35 U.S.C. 154(b) by 0 days.

(21) Appl. No.: 13/801,726

(22) Filed: Mar. 13, 2013

(65) Prior Publication Data
US 2014/0140909 A1 May 22, 2014

Related U.S. Application Data

(60) Provisional application No. 61/729,177, filed on Nov. 21, 2012, provisional application No. 61/729,227, filed on Nov. 21, 2012, provisional application No. 61/735,529, filed on Dec. 10, 2012.

(51) Int. Cl.
F01N 1/00 (2006.01)
F02B 27/04 (2006.01)
(Continued)

(52) U.S. Cl.
CPC .............. *B01J 23/63* (2013.01); *B01D 53/945* (2013.01); *B01J 21/04* (2013.01); *B01J 21/066* (2013.01); *B01J 35/0006* (2013.01); *B01J 35/04* (2013.01); *B01J 37/0045* (2013.01); *B01J 37/0228* (2013.01); *B01J 37/0244* (2013.01); *B01J 37/349* (2013.01); *B01D 2255/1021* (2013.01); *B01D 2255/1023* (2013.01); *B01D 2255/1025* (2013.01); *B01D 2255/2042* (2013.01); *B01D 2255/2065* (2013.01); *B01D 2255/20715* (2013.01); *B01D 2255/407* (2013.01); *B01D 2255/908* (2013.01);
(Continued)

(58) Field of Classification Search
USPC ......... 502/304, 327, 328, 332–334, 339, 349, 502/355, 415, 439, 527.12, 527.13; 423/212; 422/177; 60/272, 273
See application file for complete search history.

(56) References Cited

U.S. PATENT DOCUMENTS 2,021,936 A 11/1935 Johnstone
2,284,554 A 5/1942 Beyerstedt
(Continued)

FOREIGN PATENT DOCUMENTS

CN 101301610 A 11/2008
DE 34 45 273 A1 6/1986
(Continued)

OTHER PUBLICATIONS

Das, N. et al. (2001). "Influence of the Metal Function in the "One-Pot" Synthesis of 4-Methyl-2-Pentanone (Methyl Isobutyl Ketone) from Acetone Over Palladium Supported on Mg(Al)O Mixed Oxides Catalysts," *Catalysis Letters* 71(3-4): 181-185.

(Continued)

*Primary Examiner* — Cam N. Nguyen
(74) *Attorney, Agent, or Firm* — Morrison & Foerster LLP

(57) ABSTRACT

The present disclosure relates to a substrate comprising nanomaterials for treatment of gases, washcoats for use in preparing such a substrate, and methods of preparation of the nanomaterials and the substrate comprising the nanomaterials. More specifically, the present disclosure relates to a substrate comprising nanomaterial for three-way catalytic converters for treatment of exhaust gases.

32 Claims, 4 Drawing Sheets

(51) Int. Cl.

| | | |
|---|---|---|
| *B01D 50/00* | (2006.01) | |
| *B01D 53/34* | (2006.01) | |
| *B01J 23/00* | (2006.01) | |
| *B01J 23/02* | (2006.01) | |
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 20/00* | (2006.01) | |
| *B01J 21/04* | (2006.01) | |
| *B01J 23/63* | (2006.01) | |
| *B01D 53/94* | (2006.01) | |
| *B01J 37/02* | (2006.01) | |
| *B01J 37/34* | (2006.01) | |
| *B01J 35/00* | (2006.01) | |
| *B01J 21/06* | (2006.01) | |
| *B01J 35/04* | (2006.01) | |
| *B01J 37/00* | (2006.01) | |
| *F01N 3/10* | (2006.01) | |

(52) U.S. Cl.
CPC .... *B01D 2255/9022* (2013.01); *B01D 2255/91* (2013.01); *B01D 2255/9202* (2013.01); *B01D 2258/014* (2013.01); *F01N 3/101* (2013.01); *Y02T 10/22* (2013.01); *Y10T 428/24149* (2015.01); *Y10T 428/25* (2015.01)

(56) References Cited

U.S. PATENT DOCUMENTS

| | | |
|---|---|---|
| 2,419,042 A | 4/1947 | Todd |
| 2,519,531 A | 8/1950 | Worn |
| 2,562,753 A | 7/1951 | Trost |
| 2,689,780 A | 9/1954 | Rice |
| 3,001,402 A | 9/1961 | Koblin |
| 3,042,511 A | 7/1962 | Reding, Jr. |
| 3,067,025 A | 12/1962 | Chisholm |
| 3,145,287 A | 8/1964 | Siebein et al. |
| 3,178,121 A | 4/1965 | Wallace, Jr. |
| 3,179,782 A | 4/1965 | Matvay |
| 3,181,947 A | 5/1965 | Vordahl |
| 3,235,700 A | 2/1966 | Mondain-Monval et al. |
| 3,313,908 A | 4/1967 | Unger et al. |
| 3,387,110 A | 6/1968 | Wendler et al. |
| 3,401,465 A | 9/1968 | Larwill |
| 3,450,926 A | 6/1969 | Kiernan |
| 3,457,788 A | 7/1969 | Nobuo Miyajima |
| 3,520,656 A | 7/1970 | Yates et al. |
| 3,537,513 A | 11/1970 | Austin |
| 3,552,653 A | 1/1971 | Inoue |
| 3,617,358 A | 11/1971 | Dittrich |
| 3,667,111 A | 6/1972 | Chartet |
| 3,741,001 A | 6/1973 | Fletcher et al. |
| 3,752,172 A | 8/1973 | Cohen et al. |
| 3,761,360 A | 9/1973 | Auvil et al. |
| 3,774,442 A | 11/1973 | Gustaysson |
| 3,804,034 A | 4/1974 | Stiglich, Jr. |
| 3,830,756 A | 8/1974 | Sanchez et al. |
| 3,857,744 A | 12/1974 | Moss |
| 3,871,448 A | 3/1975 | Vann et al. |
| 3,892,882 A | 7/1975 | Guest et al. |
| 3,914,573 A | 10/1975 | Muehlberger |
| 3,959,094 A | 5/1976 | Steinberg |
| 3,959,420 A | 5/1976 | Geddes et al. |
| 3,969,482 A | 7/1976 | Teller |
| 4,008,620 A | 2/1977 | Narato et al. |
| 4,018,388 A | 4/1977 | Andrews |
| 4,021,021 A | 5/1977 | Hall et al. |
| 4,127,760 A | 11/1978 | Meyer et al. |
| 4,139,497 A | 2/1979 | Castor et al. |
| 4,146,654 A | 3/1979 | Guyonnet |
| 4,157,316 A | 6/1979 | Thompson et al. |
| 4,171,288 A | 10/1979 | Keith et al. |
| 4,174,298 A | 11/1979 | Antos |
| 4,189,925 A | 2/1980 | Long |
| 4,227,928 A | 10/1980 | Wang |
| 4,248,387 A | 2/1981 | Andrews |
| 4,253,917 A | 3/1981 | Wang |
| 4,260,649 A | 4/1981 | Dension et al. |
| 4,284,609 A | 8/1981 | deVries |
| 4,315,874 A | 2/1982 | Ushida et al. |
| 4,326,492 A | 4/1982 | Leibrand, Sr. et al. |
| 4,344,779 A | 8/1982 | Isserlis |
| 4,369,167 A | 1/1983 | Weir |
| 4,388,274 A | 6/1983 | Rourke et al. |
| 4,419,331 A | 12/1983 | Montalvo |
| 4,431,750 A | 2/1984 | McGinnis et al. |
| 4,436,075 A | 3/1984 | Campbell et al. |
| 4,440,733 A | 4/1984 | Lawson et al. |
| 4,458,138 A | 7/1984 | Adrian et al. |
| 4,459,327 A | 7/1984 | Wang |
| 4,505,945 A | 3/1985 | Dubust et al. |
| 4,506,136 A | 3/1985 | Smyth et al. |
| 4,513,149 A | 4/1985 | Gray et al. |
| 4,523,981 A | 6/1985 | Ang et al. |
| 4,545,872 A | 10/1985 | Sammells et al. |
| RE32,244 E | 9/1986 | Andersen |
| 4,609,441 A | 9/1986 | Frese, Jr. et al. |
| 4,610,857 A | 9/1986 | Ogawa et al. |
| 4,616,779 A | 10/1986 | Serrano et al. |
| 4,723,589 A | 2/1988 | Iyer et al. |
| 4,731,517 A | 3/1988 | Cheney |
| 4,751,021 A | 6/1988 | Mollon et al. |
| 4,764,283 A | 8/1988 | Ashbrook et al. |
| 4,765,805 A | 8/1988 | Wahl et al. |
| 4,780,591 A | 10/1988 | Bernecki et al. |
| 4,824,624 A | 4/1989 | Palicka et al. |
| 4,836,084 A | 6/1989 | Vogelesang et al. |
| 4,855,505 A | 8/1989 | Koll |
| 4,866,240 A | 9/1989 | Webber |
| 4,877,937 A | 10/1989 | Müller |
| 4,885,038 A | 12/1989 | Anderson et al. |
| 4,921,586 A | 5/1990 | Molter |
| 4,970,364 A | 11/1990 | Müller |
| 4,982,050 A | 1/1991 | Gammie et al. |
| 4,983,555 A | 1/1991 | Roy et al. |
| 4,987,033 A | 1/1991 | Abkowitz et al. |
| 5,006,163 A | 4/1991 | Benn et al. |
| 5,015,863 A | 5/1991 | Takeshima et al. |
| 5,041,713 A | 8/1991 | Weidman |
| 5,043,548 A | 8/1991 | Whitney et al. |
| 5,070,064 A | 12/1991 | Hsu et al. |
| 5,073,193 A | 12/1991 | Chaklader et al. |
| 5,133,190 A | 7/1992 | Abdelmalek |
| 5,151,296 A | 9/1992 | Tokunaga |
| 5,157,007 A | 10/1992 | Domesle et al. |
| 5,192,130 A | 3/1993 | Endo et al. |
| 5,217,746 A | 6/1993 | Lenling et al. |
| 5,225,656 A | 7/1993 | Frind |
| 5,230,844 A | 7/1993 | Macaire et al. |
| 5,233,153 A | 8/1993 | Coats |
| 5,269,848 A | 12/1993 | Nakagawa |
| 5,294,242 A | 3/1994 | Zurecki et al. |
| 5,330,945 A | 7/1994 | Beckmeyer et al. |
| 5,338,716 A | 8/1994 | Triplett et al. |
| 5,369,241 A | 11/1994 | Taylor et al. |
| 5,371,049 A | 12/1994 | Moffett et al. |
| 5,372,629 A | 12/1994 | Anderson et al. |
| 5,392,797 A | 2/1995 | Welch |
| 5,436,080 A | 7/1995 | Inoue et al. |
| 5,439,865 A | 8/1995 | Abe et al. |
| 5,442,153 A | 8/1995 | Marantz et al. |
| 5,452,854 A | 9/1995 | Keller |
| 5,460,701 A | 10/1995 | Parker et al. |
| 5,464,458 A | 11/1995 | Yamamoto |
| 5,485,941 A | 1/1996 | Guyomard et al. |
| 5,486,675 A | 1/1996 | Taylor et al. |
| 5,534,149 A | 7/1996 | Birkenbeil et al. |

(56) References Cited

U.S. PATENT DOCUMENTS

| | | |
|---|---|---|
| 5,534,270 A | 7/1996 | De Castro |
| 5,543,173 A | 8/1996 | Horn, Jr. et al. |
| 5,553,507 A | 9/1996 | Basch et al. |
| 5,558,771 A | 9/1996 | Hagen et al. |
| 5,562,966 A | 10/1996 | Clarke et al. |
| 5,582,807 A | 12/1996 | Liao et al. |
| 5,596,973 A | 1/1997 | Grice |
| 5,611,896 A | 3/1997 | Swanepoel et al. |
| 5,630,322 A | 5/1997 | Heilmann et al. |
| 5,652,304 A | 7/1997 | Calderon et al. |
| 5,714,644 A | 2/1998 | Irgang et al. |
| 5,723,027 A | 3/1998 | Serole |
| 5,723,187 A | 3/1998 | Popoola et al. |
| 5,726,414 A | 3/1998 | Kitahashi et al. |
| 5,733,662 A | 3/1998 | Bogachek |
| 5,749,938 A | 5/1998 | Coombs |
| 5,776,359 A | 7/1998 | Schultz et al. |
| 5,788,738 A | 8/1998 | Pirzada et al. |
| 5,804,155 A | 9/1998 | Farrauto et al. |
| 5,811,187 A | 9/1998 | Anderson et al. |
| 5,837,959 A | 11/1998 | Muehlberger et al. |
| 5,851,507 A | 12/1998 | Pirzada et al. |
| 5,853,815 A | 12/1998 | Muehlberger |
| 5,858,470 A | 1/1999 | Bernecki et al. |
| 5,884,473 A | 3/1999 | Noda et al. |
| 5,905,000 A | 5/1999 | Yadav et al. |
| 5,928,806 A | 7/1999 | Olah et al. |
| 5,935,293 A | 8/1999 | Detering et al. |
| 5,973,289 A | 10/1999 | Read et al. |
| 5,989,648 A | 11/1999 | Phillips |
| 5,993,967 A | 11/1999 | Brotzman, Jr. et al. |
| 5,993,988 A | 11/1999 | Ohara et al. |
| 6,004,620 A | 12/1999 | Camm |
| 6,012,647 A | 1/2000 | Ruta et al. |
| 6,033,781 A | 3/2000 | Brotzman, Jr. et al. |
| 6,045,765 A | 4/2000 | Nakatsuji et al. |
| 6,059,853 A | 5/2000 | Coombs |
| 6,066,587 A | 5/2000 | Kurokawa et al. |
| 6,084,197 A | 7/2000 | Fusaro, Jr. |
| 6,093,306 A | 7/2000 | Hanrahan et al. |
| 6,093,378 A | 7/2000 | Deeba et al. |
| 6,102,106 A | 8/2000 | Manning et al. |
| 6,117,376 A | 9/2000 | Merkel |
| 6,140,539 A | 10/2000 | Sander et al. |
| 6,168,694 B1 | 1/2001 | Huang et al. |
| 6,190,627 B1 | 2/2001 | Hoke et al. |
| 6,213,049 B1 | 4/2001 | Yang |
| 6,214,195 B1 | 4/2001 | Yadav et al. |
| 6,228,904 B1 | 5/2001 | Yadav et al. |
| 6,254,940 B1 | 7/2001 | Pratsinis et al. |
| 6,261,484 B1 | 7/2001 | Phillips et al. |
| 6,267,864 B1 | 7/2001 | Yadav et al. |
| 6,322,756 B1 | 11/2001 | Arno et al. |
| 6,342,465 B1 | 1/2002 | Klein et al. |
| 6,344,271 B1 | 2/2002 | Yadav et al. |
| 6,362,449 B1 | 3/2002 | Hadidi et al. |
| 6,379,419 B1 | 4/2002 | Celik et al. |
| 6,387,560 B1 | 5/2002 | Yadav et al. |
| 6,395,214 B1 | 5/2002 | Kear et al. |
| 6,398,843 B1 | 6/2002 | Tarrant |
| 6,399,030 B1 | 6/2002 | Nolan |
| 6,409,851 B1 | 6/2002 | Sethuram et al. |
| 6,413,781 B1 | 7/2002 | Geis et al. |
| 6,416,818 B1 | 7/2002 | Aikens et al. |
| RE37,853 E | 9/2002 | Detering et al. |
| 6,444,009 B1 | 9/2002 | Liu et al. |
| 6,475,951 B1 | 11/2002 | Domesle et al. |
| 6,488,904 B1 | 12/2002 | Cox et al. |
| 6,491,423 B1 | 12/2002 | Skibo et al. |
| 6,506,995 B1 | 1/2003 | Fusaro, Jr. et al. |
| 6,517,800 B1 | 2/2003 | Cheng et al. |
| 6,524,662 B2 | 2/2003 | Jang et al. |
| 6,531,704 B2 | 3/2003 | Yadav et al. |
| 6,548,445 B1 | 4/2003 | Buysch et al. |
| 6,554,609 B2 | 4/2003 | Yadav et al. |
| 6,562,304 B1 | 5/2003 | Mizrahi |
| 6,562,495 B2 | 5/2003 | Yadav et al. |
| 6,569,393 B1 | 5/2003 | Hoke et al. |
| 6,569,397 B1 | 5/2003 | Yadav et al. |
| 6,569,518 B2 | 5/2003 | Yadav et al. |
| 6,572,672 B2 | 6/2003 | Yadav et al. |
| 6,579,446 B1 | 6/2003 | Teran et al. |
| 6,596,187 B2 | 7/2003 | Coll et al. |
| 6,603,038 B1 | 8/2003 | Hagemeyer et al. |
| 6,607,821 B2 | 8/2003 | Yadav et al. |
| 6,610,355 B2 | 8/2003 | Yadav et al. |
| 6,623,559 B2 | 9/2003 | Huang |
| 6,635,357 B2 | 10/2003 | Moxson et al. |
| 6,641,775 B2 | 11/2003 | Vigliotti et al. |
| 6,652,822 B2 | 11/2003 | Phillips et al. |
| 6,652,967 B2 | 11/2003 | Yadav et al. |
| 6,669,823 B1 | 12/2003 | Sarkas et al. |
| 6,682,002 B2 | 1/2004 | Kyotani |
| 6,689,192 B1 | 2/2004 | Phillips et al. |
| 6,699,398 B1 | 3/2004 | Kim |
| 6,706,097 B2 | 3/2004 | Zomes |
| 6,706,660 B2 | 3/2004 | Park |
| 6,710,207 B2 | 3/2004 | Bogan, Jr. et al. |
| 6,713,176 B2 | 3/2004 | Yadav et al. |
| 6,716,525 B1 | 4/2004 | Yadav et al. |
| 6,744,006 B2 | 6/2004 | Johnson et al. |
| 6,746,791 B2 | 6/2004 | Yadav et al. |
| 6,772,584 B2 | 8/2004 | Chun et al. |
| 6,786,950 B2 | 9/2004 | Yadav et al. |
| 6,813,931 B2 | 11/2004 | Yadav et al. |
| 6,817,388 B2 | 11/2004 | Tsangaris et al. |
| 6,832,735 B2 | 12/2004 | Yadav et al. |
| 6,838,072 B1 | 1/2005 | Kong et al. |
| 6,841,509 B1 | 1/2005 | Hwang et al. |
| 6,855,410 B2 | 2/2005 | Buckley |
| 6,855,426 B2 | 2/2005 | Yadav |
| 6,855,749 B1 | 2/2005 | Yadav et al. |
| 6,858,170 B2 | 2/2005 | Van Thillo et al. |
| 6,886,545 B1 | 5/2005 | Holm |
| 6,891,319 B2 | 5/2005 | Dean et al. |
| 6,896,958 B1 | 5/2005 | Cayton et al. |
| 6,902,699 B2 | 6/2005 | Fritzemeier et al. |
| 6,916,872 B2 | 7/2005 | Yadav et al. |
| 6,919,065 B2 | 7/2005 | Zhou et al. |
| 6,919,527 B2 | 7/2005 | Boulos et al. |
| 6,933,331 B2 | 8/2005 | Yadav et al. |
| 6,972,115 B1 | 12/2005 | Ballard |
| 6,986,877 B2 | 1/2006 | Takikawa et al. |
| 6,994,837 B2 | 2/2006 | Boulos et al. |
| 7,007,872 B2 | 3/2006 | Yadav et al. |
| 7,022,305 B2 | 4/2006 | Drumm et al. |
| 7,052,777 B2 | 5/2006 | Brotzman, Jr. et al. |
| 7,073,559 B2 | 7/2006 | O'Larey et al. |
| 7,074,364 B2 | 7/2006 | Jähn et al. |
| 7,081,267 B2 | 7/2006 | Yadav |
| 7,101,819 B2 | 9/2006 | Rosenflanz et al. |
| 7,147,544 B2 | 12/2006 | Rosenflanz |
| 7,147,894 B2 | 12/2006 | Zhou et al. |
| 7,166,198 B2 | 1/2007 | Van Der Walt et al. |
| 7,166,663 B2 | 1/2007 | Cayton et al. |
| 7,172,649 B2 | 2/2007 | Conrad et al. |
| 7,172,790 B2 | 2/2007 | Koulik et al. |
| 7,178,747 B2 | 2/2007 | Yadav et al. |
| 7,208,126 B2 | 4/2007 | Musick et al. |
| 7,211,236 B2 | 5/2007 | Stark et al. |
| 7,217,407 B2 | 5/2007 | Zhang |
| 7,220,398 B2 | 5/2007 | Sutorik et al. |
| 7,255,498 B2 | 8/2007 | Bush et al. |
| 7,265,076 B2 | 9/2007 | Taguchi et al. |
| 7,282,167 B2 | 10/2007 | Carpenter |
| 7,307,195 B2 | 12/2007 | Polverejan et al. |
| 7,323,655 B2 | 1/2008 | Kim |
| 7,384,447 B2 | 6/2008 | Kodas et al. |
| 7,402,899 B1 | 7/2008 | Whiting et al. |
| 7,417,008 B2 | 8/2008 | Richards et al. |
| 7,494,527 B2 | 2/2009 | Jurewicz et al. |
| 7,507,495 B2 | 3/2009 | Wang et al. |
| 7,517,826 B2 | 4/2009 | Fujdala et al. |
| 7,534,738 B2 | 5/2009 | Fujdala et al. |

(56) References Cited

U.S. PATENT DOCUMENTS

| | | |
|---|---|---|
| 7,541,012 B2 | 6/2009 | Yeung et al. |
| 7,541,310 B2 | 6/2009 | Espinoza et al. |
| 7,557,324 B2 | 7/2009 | Nylen et al. |
| 7,572,315 B2 | 8/2009 | Boulos et al. |
| 7,576,029 B2 | 8/2009 | Saito et al. |
| 7,576,031 B2 | 8/2009 | Beutel et al. |
| 7,604,843 B1 | 10/2009 | Robinson et al. |
| 7,611,686 B2 | 11/2009 | Alekseeva et al. |
| 7,615,097 B2 | 11/2009 | McKeclutie et al. |
| 7,618,919 B2 | 11/2009 | Shimazu et al. |
| 7,622,693 B2 | 11/2009 | Foret |
| 7,632,775 B2 | 12/2009 | Zhou et al. |
| 7,635,218 B1 | 12/2009 | Lott |
| 7,674,744 B2 | 3/2010 | Shiratori et al. |
| 7,678,419 B2 | 3/2010 | Kevwitch et al. |
| 7,704,369 B2 | 4/2010 | Olah et al. |
| 7,709,411 B2 | 5/2010 | Zhou et al. |
| 7,709,414 B2 | 5/2010 | Fujdala et al. |
| 7,745,367 B2 | 6/2010 | Fujdala et al. |
| 7,750,265 B2 | 7/2010 | Belashchenko et al. |
| 7,759,279 B2 | 7/2010 | Shiratori et al. |
| 7,759,281 B2 | 7/2010 | Kezuka et al. |
| 7,803,210 B2 | 9/2010 | Sekine et al. |
| 7,842,515 B2 | 11/2010 | Zou et al. |
| 7,851,405 B2 | 12/2010 | Wakamatsu et al. |
| 7,874,239 B2 | 1/2011 | Howland |
| 7,875,573 B2 | 1/2011 | Beutel et al. |
| 7,897,127 B2 | 3/2011 | Layman et al. |
| 7,902,104 B2 | 3/2011 | Kalck |
| 7,905,942 B1 | 3/2011 | Layman |
| 7,935,655 B2 | 5/2011 | Tolmachev |
| 8,003,020 B2 | 8/2011 | Jankowiak et al. |
| 8,051,724 B1 | 11/2011 | Layman et al. |
| 8,076,258 B1 | 12/2011 | Biberger |
| 8,080,494 B2 | 12/2011 | Yasuda et al. |
| 8,089,495 B2 | 1/2012 | Keller |
| 8,129,654 B2 | 3/2012 | Lee et al. |
| 8,142,619 B2 | 3/2012 | Layman et al. |
| 8,168,561 B2 | 5/2012 | Virkar |
| 8,173,572 B2 * | 5/2012 | Feaviour ............... 502/304 |
| 8,211,392 B2 | 7/2012 | Grubert et al. |
| 8,258,070 B2 | 9/2012 | Fujdala et al. |
| 8,278,240 B2 | 10/2012 | Tange et al. |
| 8,294,060 B2 | 10/2012 | Mohanty et al. |
| 8,309,489 B2 | 11/2012 | Roldan Cuenya et al. |
| 8,349,761 B2 | 1/2013 | Xia et al. |
| 8,404,611 B2 | 3/2013 | Nakamura et al. |
| 8,524,631 B2 | 9/2013 | Biberger |
| 8,557,727 B2 | 10/2013 | Yin et al. |
| 8,574,408 B2 | 11/2013 | Layman |
| 8,574,520 B2 * | 11/2013 | Koplin et al. ............ 423/213.5 |
| 8,652,992 B2 | 2/2014 | Yin et al. |
| 8,669,202 B2 | 3/2014 | van den Hoek et al. |
| 8,679,433 B2 * | 3/2014 | Yin et al. ................ 423/213.2 |
| 2001/0004009 A1 | 6/2001 | MacKelvie |
| 2001/0042802 A1 | 11/2001 | Youds |
| 2001/0055554 A1 | 12/2001 | Hoke et al. |
| 2002/0018815 A1 | 2/2002 | Sievers et al. |
| 2002/0068026 A1 | 6/2002 | Murrell et al. |
| 2002/0071800 A1 | 6/2002 | Hoke et al. |
| 2002/0079620 A1 | 6/2002 | DuBuis et al. |
| 2002/0100751 A1 | 8/2002 | Carr |
| 2002/0102674 A1 | 8/2002 | Anderson |
| 2002/0131914 A1 | 9/2002 | Sung |
| 2002/0143417 A1 | 10/2002 | Ito et al. |
| 2002/0168466 A1 | 11/2002 | Tapphorn et al. |
| 2002/0182735 A1 | 12/2002 | Kibby et al. |
| 2002/0183191 A1 | 12/2002 | Faber et al. |
| 2002/0192129 A1 | 12/2002 | Shamouilian et al. |
| 2003/0036786 A1 | 2/2003 | Duren et al. |
| 2003/0042232 A1 | 3/2003 | Shimazu |
| 2003/0047617 A1 | 3/2003 | Shanmugham et al. |
| 2003/0066800 A1 | 4/2003 | Saim et al. |
| 2003/0085663 A1 | 5/2003 | Horsky |
| 2003/0102099 A1 | 6/2003 | Yadav et al. |
| 2003/0108459 A1 | 6/2003 | Wu et al. |
| 2003/0110931 A1 | 6/2003 | Aghajanian et al. |
| 2003/0129098 A1 | 7/2003 | Endo et al. |
| 2003/0139288 A1 | 7/2003 | Cai et al. |
| 2003/0143153 A1 | 7/2003 | Boulos et al. |
| 2003/0172772 A1 | 9/2003 | Sethuram et al. |
| 2003/0223546 A1 | 12/2003 | McGregor et al. |
| 2004/0009118 A1 | 1/2004 | Phillips et al. |
| 2004/0023302 A1 | 2/2004 | Archibald et al. |
| 2004/0023453 A1 | 2/2004 | Xu et al. |
| 2004/0077494 A1 | 4/2004 | LaBarge et al. |
| 2004/0103751 A1 | 6/2004 | Joseph et al. |
| 2004/0109523 A1 | 6/2004 | Singh et al. |
| 2004/0119064 A1 | 6/2004 | Narayan et al. |
| 2004/0127586 A1 | 7/2004 | Jin et al. |
| 2004/0129222 A1 | 7/2004 | Nylen et al. |
| 2004/0166036 A1 | 8/2004 | Chen et al. |
| 2004/0167009 A1 | 8/2004 | Kuntz et al. |
| 2004/0176246 A1 | 9/2004 | Shirk et al. |
| 2004/0208805 A1 | 10/2004 | Fincke et al. |
| 2004/0213998 A1 | 10/2004 | Hearley et al. |
| 2004/0235657 A1 | 11/2004 | Xiao et al. |
| 2004/0238345 A1 | 12/2004 | Koulik et al. |
| 2004/0251017 A1 | 12/2004 | Pillion et al. |
| 2004/0251241 A1 | 12/2004 | Blutke et al. |
| 2005/0000321 A1 | 1/2005 | O'Larey et al. |
| 2005/0000950 A1 | 1/2005 | Schroder et al. |
| 2005/0058797 A1 | 3/2005 | Sen et al. |
| 2005/0066805 A1 | 3/2005 | Park et al. |
| 2005/0070431 A1 | 3/2005 | Alvin et al. |
| 2005/0077034 A1 | 4/2005 | King |
| 2005/0097988 A1 | 5/2005 | Kodas et al. |
| 2005/0106865 A1 | 5/2005 | Chung et al. |
| 2005/0133121 A1 | 6/2005 | Subramanian et al. |
| 2005/0153069 A1 | 7/2005 | Tapphorn et al. |
| 2005/0163673 A1 | 7/2005 | Johnson et al. |
| 2005/0199739 A1 | 9/2005 | Kuroda et al. |
| 2005/0211018 A1 | 9/2005 | Jurewicz et al. |
| 2005/0220695 A1 | 10/2005 | Abatzoglou et al. |
| 2005/0227864 A1 | 10/2005 | Sutorik et al. |
| 2005/0233380 A1 | 10/2005 | Pesiri et al. |
| 2005/0240069 A1 | 10/2005 | Polverejan et al. |
| 2005/0258766 A1 | 11/2005 | Kim |
| 2005/0274646 A1 | 12/2005 | Lawson et al. |
| 2005/0275143 A1 | 12/2005 | Toth |
| 2006/0043651 A1 | 3/2006 | Yamamoto et al. |
| 2006/0051505 A1 | 3/2006 | Kortshagen et al. |
| 2006/0068989 A1 | 3/2006 | Ninomiya et al. |
| 2006/0094595 A1 | 5/2006 | Labarge |
| 2006/0096393 A1 | 5/2006 | Pesiri |
| 2006/0105910 A1 | 5/2006 | Zhou et al. |
| 2006/0108332 A1 | 5/2006 | Belashchenko |
| 2006/0153728 A1 | 7/2006 | Schoenung et al. |
| 2006/0153765 A1 | 7/2006 | Pham-Huu et al. |
| 2006/0159596 A1 | 7/2006 | De La Veaux et al. |
| 2006/0166809 A1 | 7/2006 | Malek et al. |
| 2006/0211569 A1 | 9/2006 | Dang et al. |
| 2006/0213326 A1 | 9/2006 | Gollob et al. |
| 2006/0222780 A1 | 10/2006 | Gurevich et al. |
| 2006/0231525 A1 | 10/2006 | Asakawa et al. |
| 2007/0020167 A1 | 1/2007 | Han et al. |
| 2007/0044513 A1 | 3/2007 | Kear et al. |
| 2007/0048206 A1 | 3/2007 | Hung et al. |
| 2007/0049484 A1 | 3/2007 | Kear et al. |
| 2007/0063364 A1 | 3/2007 | Hsiao et al. |
| 2007/0084308 A1 | 4/2007 | Nakamura et al. |
| 2007/0084834 A1 | 4/2007 | Hanus et al. |
| 2007/0087934 A1 | 4/2007 | Martens et al. |
| 2007/0092768 A1 | 4/2007 | Lee et al. |
| 2007/0153390 A1 | 7/2007 | Nakamura et al. |
| 2007/0161506 A1 | 7/2007 | Saito et al. |
| 2007/0163385 A1 | 7/2007 | Takahashi et al. |
| 2007/0172721 A1 | 7/2007 | Pak et al. |
| 2007/0173403 A1 | 7/2007 | Koike et al. |
| 2007/0178673 A1 | 8/2007 | Gole et al. |
| 2007/0221404 A1 | 9/2007 | Das et al. |
| 2007/0253874 A1 | 11/2007 | Foret |
| 2007/0266825 A1 | 11/2007 | Ripley et al. |
| 2007/0292321 A1 | 12/2007 | Plischke et al. |

(56) References Cited

U.S. PATENT DOCUMENTS

| | | |
|---|---|---|
| 2008/0006954 A1 | 1/2008 | Yubuta et al. |
| 2008/0026041 A1 | 1/2008 | Tepper et al. |
| 2008/0031806 A1 | 2/2008 | Gavenonis et al. |
| 2008/0038578 A1 | 2/2008 | Li |
| 2008/0045405 A1 | 2/2008 | Beutel et al. |
| 2008/0047261 A1 | 2/2008 | Han et al. |
| 2008/0057212 A1 | 3/2008 | Dorier et al. |
| 2008/0064769 A1 | 3/2008 | Sato et al. |
| 2008/0104735 A1 | 5/2008 | Howland |
| 2008/0105083 A1 | 5/2008 | Nakamura et al. |
| 2008/0116178 A1 | 5/2008 | Weidman |
| 2008/0125308 A1 | 5/2008 | Fujdala et al. |
| 2008/0125313 A1 | 5/2008 | Fujdala et al. |
| 2008/0138651 A1 | 6/2008 | Doi et al. |
| 2008/0175936 A1 | 7/2008 | Tokita et al. |
| 2008/0187714 A1 | 8/2008 | Wakamatsu et al. |
| 2008/0206562 A1 | 8/2008 | Stucky et al. |
| 2008/0207858 A1 | 8/2008 | Kowaleski et al. |
| 2008/0248704 A1 | 10/2008 | Mathis et al. |
| 2008/0274344 A1 | 11/2008 | Veith et al. |
| 2008/0277092 A1 | 11/2008 | Layman et al. |
| 2008/0277264 A1 | 11/2008 | Sprague |
| 2008/0277266 A1 | 11/2008 | Layman |
| 2008/0277267 A1 | 11/2008 | Biberger et al. |
| 2008/0277268 A1 | 11/2008 | Layman |
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger |
| 2008/0283411 A1 | 11/2008 | Eastman et al. |
| 2008/0283498 A1 | 11/2008 | Yamazaki |
| 2008/0307960 A1 | 12/2008 | Hendrickson et al. |
| 2009/0010801 A1 | 1/2009 | Murphy et al. |
| 2009/0018008 A1 | 1/2009 | Jankowiak et al. |
| 2009/0054230 A1 | 2/2009 | Veeraraghavan et al. |
| 2009/0081092 A1 | 3/2009 | Yang et al. |
| 2009/0088585 A1 | 4/2009 | Schammel et al. |
| 2009/0092887 A1 | 4/2009 | McGrath et al. |
| 2009/0098402 A1 | 4/2009 | Kang et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |
| 2009/0181474 A1 | 7/2009 | Nagai |
| 2009/0200180 A1 | 8/2009 | Capote et al. |
| 2009/0208367 A1 | 8/2009 | Calio et al. |
| 2009/0209408 A1 | 8/2009 | Kitamura et al. |
| 2009/0223410 A1 | 9/2009 | Jun et al. |
| 2009/0253037 A1 | 10/2009 | Park et al. |
| 2009/0274897 A1 | 11/2009 | Kaner et al. |
| 2009/0274903 A1 | 11/2009 | Addiego |
| 2009/0286899 A1 | 11/2009 | Hofmann et al. |
| 2009/0320449 A1 | 12/2009 | Beutel et al. |
| 2009/0324468 A1 | 12/2009 | Golden et al. |
| 2010/0050868 A1 | 3/2010 | Kuznicki et al. |
| 2010/0089002 A1 | 4/2010 | Merkel |
| 2010/0092358 A1 | 4/2010 | Koegel et al. |
| 2010/0124514 A1 | 5/2010 | Chelluri et al. |
| 2010/0166629 A1 | 7/2010 | Deeba |
| 2010/0180581 A1 | 7/2010 | Grubert et al. |
| 2010/0180582 A1 | 7/2010 | Mueller-Stach et al. |
| 2010/0186375 A1 | 7/2010 | Kazi et al. |
| 2010/0240525 A1 | 9/2010 | Golden et al. |
| 2010/0275781 A1 | 11/2010 | Tsangaris |
| 2010/0323118 A1 | 12/2010 | Mohanty et al. |
| 2011/0006463 A1 | 1/2011 | Layman |
| 2011/0030346 A1 | 2/2011 | Neubauer et al. |
| 2011/0049045 A1 | 3/2011 | Hurt et al. |
| 2011/0052467 A1 | 3/2011 | Chase et al. |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143926 A1 | 6/2011 | Yin et al. |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0158871 A1 | 6/2011 | Arnold et al. |
| 2011/0174604 A1 | 7/2011 | Duesel et al. |
| 2011/0243808 A1 | 10/2011 | Fossey et al. |
| 2011/0245073 A1 | 10/2011 | Oljaca et al. |
| 2011/0247336 A9 | 10/2011 | Farsad et al. |
| 2011/0305612 A1 | 12/2011 | Müller-Stach et al. |
| 2012/0023909 A1 | 2/2012 | Lambert et al. |
| 2012/0045373 A1 | 2/2012 | Biberger |
| 2012/0063963 A1 | 3/2012 | Watanabe et al. |
| 2012/0097033 A1 | 4/2012 | Arnold et al. |
| 2012/0122660 A1 | 5/2012 | Andersen et al. |
| 2012/0124974 A1 | 5/2012 | Li et al. |
| 2012/0171098 A1 | 7/2012 | Hung et al. |
| 2012/0214666 A1 | 8/2012 | van den Hoek et al. |
| 2012/0263633 A1* | 10/2012 | Koplin et al. ............ 423/213.5 |
| 2012/0308467 A1 | 12/2012 | Carpenter et al. |
| 2012/0313269 A1 | 12/2012 | Kear et al. |
| 2013/0034472 A1* | 2/2013 | Cantrell et al. ............ 422/177 |
| 2013/0079216 A1 | 3/2013 | Biberger et al. |
| 2013/0125970 A1 | 5/2013 | Ko et al. |
| 2013/0213018 A1 | 8/2013 | Yin et al. |
| 2013/0280528 A1 | 10/2013 | Biberger |
| 2013/0281288 A1 | 10/2013 | Biberger et al. |
| 2013/0294989 A1* | 11/2013 | Koch et al. ............ 423/213.5 |
| 2013/0316896 A1 | 11/2013 | Biberger |
| 2013/0331257 A1 | 12/2013 | Barcikowski et al. |
| 2013/0345047 A1 | 12/2013 | Biberger et al. |
| 2014/0018230 A1 | 1/2014 | Yin et al. |
| 2014/0120355 A1 | 5/2014 | Biberger |
| 2014/0128245 A1 | 5/2014 | Yin et al. |
| 2014/0148331 A1 | 5/2014 | Biberger et al. |
| 2014/0161693 A1* | 6/2014 | Brown et al. ............ 423/212 |
| 2014/0209451 A1 | 7/2014 | Biberger et al. |
| 2014/0228201 A1 | 8/2014 | Mendoza Gómez et al. |
| 2014/0243187 A1* | 8/2014 | Yin et al. ............ 502/5 |
| 2014/0249021 A1 | 9/2014 | van den Hoek et al. |
| 2014/0252270 A1 | 9/2014 | Lehman, Jr. |
| 2014/0263190 A1 | 9/2014 | Biberger et al. |
| 2014/0318318 A1 | 10/2014 | Layman et al. |
| 2014/0338519 A1 | 11/2014 | Biberger |

FOREIGN PATENT DOCUMENTS

| | | |
|---|---|---|
| EP | 0 347 386 A1 | 12/1989 |
| EP | 0 385 742 A1 | 9/1990 |
| EP | 1 134 302 A1 | 9/2001 |
| EP | 1 256 378 A2 | 11/2002 |
| EP | 1 619 168 A1 | 1/2006 |
| EP | 1 790 612 A1 | 5/2007 |
| EP | 1 955 765 A1 | 8/2008 |
| GB | 1 307 941 A | 2/1973 |
| JP | 49-31571 A | 3/1974 |
| JP | 56-146804 A | 11/1981 |
| JP | 61-086815 A | 5/1986 |
| JP | 62-102827 A | 5/1987 |
| JP | 63-214342 A | 9/1988 |
| JP | 1-164795 A | 6/1989 |
| JP | 2-6339 A | 1/1990 |
| JP | 3-226509 A | 10/1991 |
| JP | 5-193909 A | 8/1993 |
| JP | 05-228361 A | 9/1993 |
| JP | 05-324094 A | 12/1993 |
| JP | 6-93309 A | 4/1994 |
| JP | 6-135797 A | 5/1994 |
| JP | 6-172820 A | 6/1994 |
| JP | 6-065772 U | 9/1994 |
| JP | 6-272012 A | 9/1994 |
| JP | 07-031873 A | 2/1995 |
| JP | 7-138020 A | 5/1995 |
| JP | 7-207381 A | 8/1995 |
| JP | 07-256116 A | 10/1995 |
| JP | 8-158033 A | 6/1996 |
| JP | 8-215576 A | 8/1996 |
| JP | 8-217420 A | 8/1996 |
| JP | 9-141087 A | 6/1997 |

(56) References Cited

FOREIGN PATENT DOCUMENTS

| | | |
|---|---|---|
| JP | 10-130810 A | 5/1998 |
| JP | 10-249198 A | 9/1998 |
| JP | 11-502760 A | 3/1999 |
| JP | 2000-220978 A | 8/2000 |
| JP | 2002-88486 A | 3/2002 |
| JP | 2002-241812 A | 8/2002 |
| JP | 2002-336688 A | 11/2002 |
| JP | 2003-126694 A | 5/2003 |
| JP | 2004-233007 A | 8/2004 |
| JP | 2004-249206 A | 9/2004 |
| JP | 2004-290730 A | 10/2004 |
| JP | 2005-503250 A | 2/2005 |
| JP | 2005-122621 A | 5/2005 |
| JP | 2005-218937 A | 8/2005 |
| JP | 2005-342615 A | 12/2005 |
| JP | 2006-001779 A | 1/2006 |
| JP | 2006-508885 A | 3/2006 |
| JP | 2006-87965 A | 4/2006 |
| JP | 2006-247446 A | 9/2006 |
| JP | 2006-260385 A | 9/2006 |
| JP | 2006-326554 A | 12/2006 |
| JP | 2007-29859 A | 2/2007 |
| JP | 2007-44585 A | 2/2007 |
| JP | 2007-46162 A | 2/2007 |
| JP | 2007-138287 A | 6/2007 |
| JP | 2007-203129 A | 8/2007 |
| SU | 493241 A | 3/1976 |
| TW | 200611449 | 4/2006 |
| TW | 201023207 A | 6/2010 |
| WO | WO-96/28577 A1 | 9/1996 |
| WO | WO-00/72965 A1 | 12/2000 |
| WO | WO-02/092503 A1 | 11/2002 |
| WO | WO-03/094195 A1 | 11/2003 |
| WO | WO-2004/052778 A2 | 6/2004 |
| WO | WO-2005/063390 A1 | 7/2005 |
| WO | WO 2006/079213 A1 | 8/2006 |
| WO | WO-2006/096205 A2 | 9/2006 |
| WO | WO-2007/144447 A1 | 12/2007 |
| WO | WO-2008/092478 A1 | 8/2008 |
| WO | WO-2008/130451 A2 | 10/2008 |
| WO | WO-2008/130451 A3 | 10/2008 |
| WO | WO-2009/017479 A1 | 2/2009 |
| WO | WO-2011/081833 A1 | 7/2011 |
| WO | WO-2012/028695 A2 | 3/2012 |
| WO | WO-2013/028575 A1 | 2/2013 |
| WO | WO-2013/093597 A2 | 6/2013 |
| WO | WO-2013/151557 A1 | 10/2013 |

OTHER PUBLICATIONS

Lakis, R. E. et al. (1995). "Alumina-Supported Pt—Rh Catalysts: I. Microstructural Characterization," *Journal of Catalysis* 154: 261-275.
Schimpf, S. et al. (2002). "Supported Gold Nanoparticles: In-Depth Catalyst Characterization and Application in Hydrogenation and Oxidation Reactions," *Catalysis Today* 2592: 1-16.
Bateman, J. E. et al. (Dec. 17, 1998). "Alkylation of Porous Silicon by Direct Reaction with Alkenes and Alkynes," *Angew. Chem Int. Ed.* 37(19):2683-2685.
Carrot, G. et al. (Sep. 17, 2002). "Surface-Initiated Ring-Opening Polymerization: A Versatile Method for Nanoparticle Ordering," *Macromolecules* 35(22):8400-8404.
Chen, H.-S. et al. (Jul. 3, 2001). "On the Photoluminescence of Si Nanoparticles," *Mater. Phys. Mech.* 4:62-66.
Faber, K. T. et al. (Sep. 1988). "Toughening by Stress-Induced Microcracking in Two-Phase Ceramics," *Communications of the American Ceramic Society* 71(9): C-399-C401.
Fauchais, P. et al. (Jun. 1989). "La Projection Par Plasma: Une Revue," *Ann. Phys. Fr.* 14(3):261-310.
Fauchais, P. et al. (Jan. 1993). "Les Dépôts Par Plasma Thermique," *Revue Générale De L'Electricité*, RGE, Paris, France, No. 2, pp. 7-12 (in French).
Fauchais, P. et al. (Jan. 1996). "Plasma Spray: Study of the Coating Generation," *Ceramics International* 22(4):295-303.
Fojtik, A. et al. (Apr. 29, 1994). "Luminescent Colloidal Silicon Particles,"*Chemical Physics Letters* 221 :363-367.
Fojtik, A. (Jan. 13, 2006). "Surface Chemistry of Luminescent Colloidal Silicon Nanoparticles," *J. Phys. Chem. B*. 110(5):1994-1998.
Gutsch, A. et al. (2002). "Gas-Phase Production of Nanoparticles," *Kona* No. 20, pp. 24-37.
Han, B. Q. et al. (Jan. 2004). "Deformation Mechanisms and Ductility of Nanostructured Al Alloys", *Mat. Res. Soc. Symp. Proc*. 821:P9.1.1-P9.1.6.
Heberlein, J. (2002). "New Approaches in Thermal Plasma Technology", *Pure Appl. Chem*. 74(3):327-335.
Hua, F. et al. (Mar. 2006). "Organically Capped Silicon Nanoparticles With Blue Photoluminescence Prepared by Hydrosilylation Followed by Oxidation," *Langmuir* 22(9):4363-4370.
Ji, Y. et al. (Nov. 2002) "Processing and Mechanical Properties of $Al_2O_3$-5 vol.% Cr Nanocomposites," *Journal of the European Ceramic Society* 22(12):1927-1936.
Jouet, R. J. et al. (Jan. 25, 2005). "Surface Passivation of Bare Aluminum Nanoparticles Using Perfluoroalkyl Carboxylic Acids," *Chem. Mater*.17(11):2987-2996.
Kenvin, J. C. et al. (1992). "Supported Catalysts Prepared from Mononuclear Copper Complexes: Catalytic Properties", *J. Catalysis* 135:81-91.
Konrad, H. et al. (1996). "Nanostructured Cu—Bi Alloys Prepared by Co-Evaporation in a Continuous Gas Flow," *NanoStructured Materials* 7(6):605-610.
Kim, N. Y. et al. (Mar. 5, 1997). "Thermal Derivatization of Porous Silicon with Alcohols," *J. Am. Chem. Soc*. 119(9):2297-2298.
Kwon, Y.-S. et al. (Apr. 30, 2003). "Passivation Process for Superfine Aluminum Powders Obtained by Electrical Explosion of Wires," *Applied Surface Science* 211:57-67.
Langner, A. et al. (Aug. 25, 2005). "Controlled Silicon Surface Functionalization by Alkene Hydrosilylation," *J. Am. Chem. Soc*. 127(37):12798-12799.
Li, D. et al. (Apr. 9, 2005). "Environmentally Responsive "Hairy" Nanoparticles: Mixed Homopolymer Brushes on Silica Nanoparticles Synthesized by Living Radical Polymerization Techniques," *J. Am. Chem. Soc*. 127(7):6248-6256.
Li, X. et al. (May 25, 2004). "Surface Functionalization of Silicon Nanoparticles Produced by Laser-Driven Pyrolysis of Silane Followed by HF—$HNO_3$ Etching," *Langmuir* 20(11):4720-4727.
Liao, Y.-C. et al. (Jun. 27, 2006). "Self-Assembly of Organic Monolayers on Aerosolized Silicon Nanoparticles," *J.Am. Chem. Soc*. 128(28):9061-9065.
Liu, S.-M. et al. (Jan. 13, 2006). "Enhanced Photoluminescence from Si Nano-Organosols by Functionalization With Alkenes and Their Size Evolution," *Chem. Mater*. 18(3):637-642.
Mühlenweg, H. et al. (2004). "Gas-Phase Reactions—Open Up New Roads to Nanoproducts," *Degussa ScienceNewsletter* No. 08, pp. 12-16.
Nagai, Y. et al. (Jul. 3, 2006). "Sintering Inhibition Mechanism of Platinum Supported on Ceria-Based Oxide and Pt-Oxide-Support Interaction," *J. Catalysis* 242:103-109.
Nasa (2009). "Enthalpy," Article located at http://www.grc.nasa.gov/WWW/K-12/airplane/enthalpy.htrnl, published by National Aeronautics and Space Administration on Nov. 23, 2009, 1 page.
Neiner, D. (Aug. 5, 2006). "Low-Temperature Solution Route to Macroscopic Amounts of Hydrogen Terminated Silicon Nanoparticles," *J. Am. Chem. Soc*. 128:11016-11017.
Netzer, L. et al. (1983). "A New Approach to Construction of Artificial Monolayer Assemblies," *J. Am. Chem. Soc*. 105(3):674-676.
"Platinum Group Metals: Annual Review 1996" (Oct. 1997). Engineering and Mining Journal, p. 63.
Rahaman, R. A. et al. (1995). "Synthesis of Powders," in *Ceramic Processing and Sintering*. Marcel Decker, Inc., New York, pp. 71-77.
Sailor, M. J. (1997). "Surface Chemistry of Luminescent Silicon Nanocrystallites," *Adv. Mater*. 9(10):783-793.
Stiles, A. B. (Jan. 1, 1987). "Manufacture of Carbon-Supported Metal Catalysts," in *Catalyst Supports and Supported Catalysts*, Butterworth Publishers, MA, pp. 125-132.

(56) References Cited

OTHER PUBLICATIONS

Subramanian, S. et al. (1991). "Structure and Activity of Composite Oxide Supported Platinum—Iridium Catalysts," *Applied Catalysts* 74: 65-81.
Tao, Y.-T. (May 1993). "Structural Comparison of Self-Assembled Monolayers of n-Alkanoic Acids on the surfaces of Silver, Copper, and Aluminum," *J. Am. Chem. Soc.* 115(10):4350-4358.
Ünal, N. et al. (Nov. 2011). "Influence of WC Particles on the Microstructural and Mechanical Properties of 3 mol% $Y_2O_3$ Stabilized $ZrO_2$ Matrix Composites Produced by Hot Pressing," Journal of the European Ceramic Society (31)13: 2267-2275.
Vardelle, A. et al. (1996). "Coating Generation: Vaporization of Particles in Plasma Spraying and Splat Formation," Universite de Limoges, 123 Avenue A. Thomas 87000, Limoges, France, *Pure & Appl. Chem.* 68(5):1093-1099.
Vardelle, M. et al. (Jun. 1991). "Experimental Investigation of Powder Vaporization in Thermal Plasma Jets," *Plasma Chemistry and Plasma Processing* 11(2):185-201.
Yoshida, T. (1994). "The Future of Thermal Plasma Processing for Coating", *Pure & Appl. Chem.* 66(6):1223-1230.
Zou, J. et al. (Jun. 4, 2004). "Solution Synthesis of Ultrastable Luminescent Siloxane-Coated Silicon Nanoparticles," *Nano Letters* 4(7):1181-1186.
U.S. Appl. No. 13/291,983, filed Nov. 8, 2011, for Layman et al.
U.S. Appl. No. 12/152,084, filed May 9, 2008, for Biberger.
U.S. Appl. No. 13/028,693, filed Feb. 16, 2011, for Biberger.
U.S. Appl. No. 12/943,909, filed Nov. 10, 2010, for Layman.
U.S. Appl. No. 12/152,111, filed May 9, 2008, for Biberger et al.
U.S. Appl. No. 12/151,830, filed May 8, 2008, for Biberger et al.
U.S. Appl. No. 12/968,248, filed Dec. 14, 2010, for Biberger.
U.S. Appl. No. 12/968,245, filed Dec. 14, 2010, for Biberger.
U.S. Appl. No. 12/968,241, filed Dec. 14, 2010, for Biberger.
U.S. Appl. No. 12/968,239, filed Dec. 14, 2010, for Biberger.
U.S. Appl. No. 12/969,128, filed Dec. 15, 2010, for Biberger.
U.S. Appl. No. 12/962,463, filed Dec. 7, 2010, for Leaman.
U.S. Appl. No. 12/961,030, filed Dec. 6, 2010, for Lehman.
U.S. Appl. No. 12/961,108, filed Dec. 6, 2010, for Lehman.
U.S. Appl. No. 12/961,200, filed Dec. 6, 2010, for Lehman.
U.S. Appl. No. 12/968,253, filed Dec. 14, 2010, for Biberger.
U.S. Appl. No. 12/968,235, filed Dec. 14, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/969,087, filed Dec. 15, 2010, for Biberger.
U.S. Appl. No. 12/962,533, filed Dec. 7, 2010, for Yin et al.
U.S. Appl. No. 12/962,523, filed Dec. 7, 2010, for Yin et al.
U.S. Appl. No. 12/001,643, filed Dec. 11, 2007, for Biberger et al.
U.S. Appl. No. 12/474,081, filed May 28, 2009, for Biberger et al.
U.S. Appl. No. 12/001,602, filed Dec. 11, 2007, for Biberger et al.
U.S. Appl. No. 12/001,644, filed Dec. 11, 2007, for Biberger et al.
U.S. Appl. No. 12/969,457, filed Nov. 15, 2010, for Leamon et al.
U.S. Appl. No. 12/969,503, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.
U.S. Appl. No. 13/033,514, filed Feb. 23, 2011, for Biberger et al.
U.S. Appl. No. 13/589,024, filed Aug. 17, 2012, for Yin et al.
Chaim, R. et al. (2009). "Densification of Nanocrystalline $Y_2O_3$ Ceramic Powder by Spark Plasma Sintering," *Journal of European Ceramic Society* 29: 91-98.
Viswanathan, V. et al. (2006). "Challenges and Advances in Nanocomposite Processing Techniques," *Materials Science and Engineering R* 54: 121-285.
Babin, A. et al. (1985). "Solvents Used in the Arts," *Center for Safety in the Arts*: 16 pages.
Chen, W.-J. et al. (Mar. 18, 2008). "Functional $Fe_3O_4/TiO_2$ Core/Shell Magnetic Nanoparticles as Photokilling Agents for Pathogenic Bacteria," *Small* 4(4): 485-491.
Gangeri, M. et al. (2009). "Fe and Pt Carbon Nanotubes for the Electrocatalytic Conversion of Carbon Dioxide to Oxygenates," *Catalysis Today* 143: 57-63.
Luo, J. et al. (2008). "Core/Shell Nanoparticles as Electrocatalysts for Fuel Cell Reactions," *Advanced Materials* 20: 4342-4347.
Mignard, D. et al. (2003). "Methanol Synthesis from Flue-Gas $CO_2$ and Renewable Electricity: A Feasibility Study," *International Journal of Hydrogen Energy* 28: 455-464.
Park, H.-Y. et al. (May 30, 2007). "Fabrication of Magnetic CoregShell Fe Oxide@Au Nanoparticles for Interfacial Bioactivity and Bio-Separation," *Langmuir* 23: 9050-9056.
Park, N.-G. et al. (Feb. 17, 2004). "Morphological and Photoelectrochemical Characterization of Core-Shell Nanoparticle Films for Dye-Sensitized Solar Cells: Zn—O Type Shell on $SnO_2$ and $TiO_2$ Cores," *Langmuir* 20: 4246-4253.
"Plasma Spray and Wire Flame Spray Product Group," located at http://www.processmaterials.com/spray.html, published by Process Materials, Inc., last accessed Aug. 5, 2013, 2 pages.
Ahmad, K. et al. (2008). "Hybrid Nanocomposites: A New Route Towards Tougher Alumina Ceramics," *Composites Science and Technology* 68: 1321-1327.
Chau, J. K. H. et al. (2005). "Microwave Plasma Synthesis of Silver Nanopowders," *Materials Letters* 59: 905-908.
Ihlein, G. et al.(1998). "Ordered Porous Materials as Media for the Organization of Matter on The Nanoscale," *Applied Organometallic Chemistry* 12: 305-314.
Lamouroux, E. et al. (2007). "Identification of Key Parameters for the Selective Growth of Single or Double Wall Carbon Nanotubes on FeMo/$Al_2O_3$ CVD Catalysts," *Applied Catalysts A: General* 323: 162-173.
Martinez-Hansen, V. et al. (2009). "Development of Aligned Carbon Nanotubes Layers Over Stainless Steel Mesh Monoliths," *Catalysis Today* 1475: 571-575.
Panchula, M. L. et al. (2003). "Nanocrystalline Aluminum Nitride: I, Vapor-Phase Synthesis in a Forced-Flow Reactor," *Journal of the American Ceramic Society* 86(7): 1114-1120.
Wan, J. et al. (2005). "Spark Plasma Sintering of Silicon Nitride/Silicon Carbide Nanocomposites with Reduced Additive Amounts," *Scripta Materialia* 53: 663-667.

\* cited by examiner

THREE-WAY CATALYTIC CONVERTER USING NANOPARTICLES

CROSS-REFERENCE TO RELATED APPLICATIONS

This application claims priority benefit of U.S. Provisional Patent Application No. 61/729,177, filed Nov. 21, 2012, U.S. Provisional Patent Application No. 61/729,227 filed Nov. 21, 2012, and U.S. Provisional Patent Application No. 61/735,529 filed Dec. 10, 2012. The entire contents of all of those applications are hereby incorporated by reference herein.

TECHNICAL FIELD OF THE INVENTION

The present disclosure relates to the field of catalysts, substrates including nanoparticles for gas treatment, and methods of preparation of the same. More specifically, the present disclosure relates to substrates including nanomaterial for three-way catalytic converters.

BACKGROUND

Car exhaust often contains environmentally and biologically harmful compositions, including hydrocarbons, carbon monoxide, and nitrogen oxide. Some of these compositions come from incomplete combustion of gasoline or other fuels. These compositions are often formed in the high temperature environment of the engines.

Catalytic converters are used to convert these environmentally and biologically harmful compositions into less or non-environmentally harmful compositions, such as carbon dioxide, water, nitrogen, and oxygen. A catalytic converter typically includes a catalytic converter core that is coated with a catalyst-containing washcoat. The core of the catalytic converter normally includes a grid array structure that provides a large surface area to support the catalysts. The washcoats generally contain silica and alumina, which provide an even larger surface area for active precious metal catalysts. The active precious metal catalysts often include platinum, palladium, and rhodium. Other metals that are also catalytically active can also be used as catalysts, such as cerium, iron, manganese, and nickel.

Two types of catalytic converters are generally available, two-way and three-way catalytic converters. The three-way catalytic converter is widely used on gasoline engines to reduce the emission of hydrocarbons, carbon monoxide, and nitrogen oxides. With the assistance of the active catalysts, the carbon monoxide and hydrocarbons are oxidized and converted into carbon dioxide, and the nitrogen oxides are reduced and converted into nitrogen, as shown below in the below Equations.

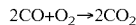
$2CO+O_2 \rightarrow 2CO_2$

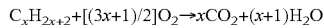
$C_xH_{2x+2}+[(3x+1)/2]O_2 \rightarrow xCO_2+(x+1)H_2O$

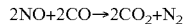
$2NO+2CO \rightarrow 2CO_2+N_2$

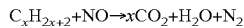
$C_xH_{2x+2}+NO \rightarrow xCO_2+H_2O+N_2$

Traditionally, the three-way catalytic converters are prepared by separately mixing oxidative precious metals, such as platinum or palladium, with aluminum oxide, water, and other components to make a slurry in one container and mixing reductive precious metal, such as rhodium, with cerium zirconium oxide, water, and other components to make a second slurry in a second container. The slurries are normally referred to as oxidative and reductive washcoats. A ceramic monolith, which can be cylindrically shaped, having a grid array structure is dipped into one of the washcoats to form a first catalytic layer on the ceramic monolith. After drying and calcining, the ceramic monolith is dipped into another washcoat to form a second layer on the ceramic monolith. The ceramic monolith including the two washcoat layers is fitted into a shell of a catalytic converter, which connects to the engine for treating exhaust gas.

Catalytic converters made by traditional methods suffer from problems. One big problem is that traditional catalysts age over time, due to the exposure to the high temperature exhaust gases. During normal operation, the temperature within a typical gasoline engine catalytic converter can 1,000 degrees ° F., or in some instances even higher. These high temperatures give the precious metal nano-particles in the washcoat layer increased mobility—which results in these particles moving more quickly through the washcoat layers. When the precious metal nano-particles encounter one another as they move through the washcoat layer, they can sinter or coalesce into larger metal particles in a phenomenon known as "aging." This aging phenomenon results in the loss of available reactive surfaces of the precious metals. Accordingly, through aging catalytic converters become less effective, the light-off temperature starts to rise, and emissions levels start to rise.

The aging phenomenon is even more of an issue in gasoline engines that use three ways catalytic converters than in diesel engines that can use two-way catalytic converters. This is because the exhaust temperature of a gasoline exhaust is higher than the temperature of a diesel exhaust. In addition, the three-way catalytic converter has to deal with both the aging of the oxidation and the reduction catalysts. To counteract these aging effects, catalytic converter manufacturers can increase the amount of precious metal particles initially present in the catalytic converter. However, increasing the amount of precious metal in the converter is both expensive and wasteful.

Accordingly, better materials and methods to prepare the three-way active catalytic materials are needed.

SUMMARY

Described are coated substrates for use in three-way catalytic converters. The coated substrates decrease the rate of the aging phenomenon that plagues typical three-way catalytic converters. This allows for both the oxidation and reduction activity of three-way catalytic converters using these substrates to remain stable when exposed to the high-temperature environment of gasoline exhausts.

As described herein, the mobility of both the catalytically active oxidation and reduction particles are constrained. This means that the precious metals in the described washcoat mixtures are less likely to sinter or coalesce into larger metal particles and are less likely to have reduced catalytic activity as they age. These improvements result in the reduction of pollution released to the environment during the lifetime of the catalytic converter and vehicle and/or decrease in the amount of precious metal oxidation and reduction catalyst used to make an effective catalytic converter.

The coated substrates for use in three-way catalytic converters reduce emissions of hydrocarbons, carbon monoxide, and nitrogen oxides. In certain embodiments, the coated substrates may exhibit performance in converting hydrocarbons, carbon monoxide, and nitrogen oxides that is comparable or better than present commercial coated substrates with the same or less loading of PGM.

The coated substrates include both oxidative catalytically active particles and reductive catalytically active particles. The oxidative catalytically active particles include oxidative composite nanoparticles bonded to micron-sized carrier particles, and the oxidative composite nanoparticles include a first support nanoparticle and one or more oxidative nanoparticles. The reductive catalytically active particles include reductive composite nanoparticles bonded to micron-sized carrier particles. The reductive composite nanoparticles include a second support nanoparticle and one or more reductive nanoparticles. The oxidative catalytically active particles and reductive catalytically active particles may be effective to oxidize carbon monoxide and hydrocarbons and reduce nitrogen oxides. The oxidative catalytically active particles and reductive catalytically active particles may be in the same or different washcoat layers as described herein.

One embodiment of a coated substrate includes oxidative catalytically active particles including oxidative composite nanoparticles bonded to first micron-sized carrier particles, wherein the oxidative composite nanoparticles include a first support nanoparticle and one or more oxidative catalyst nanoparticles, and reductive catalytically active particles including reductive composite nanoparticles bonded to second micron-sized carrier particles, wherein the reductive composite nanoparticles include a second support nanoparticle and one or more reductive catalyst nanoparticles.

In some embodiments, the coated substrate includes at least two washcoat layers in which the oxidative catalytically active particles are in one washcoat layer and the reductive catalytically active particles are in another washcoat layer. In some embodiments, the oxidative catalytically active particles and the reductive catalytically active particles are in the same washcoat layer.

In any of the embodiments, the oxidative catalyst nanoparticles may include platinum, palladium, or a mixture thereof. In any of the embodiments, the oxidative catalyst nanoparticles may include palladium. In any of the embodiments, the first support nanoparticles may include aluminum oxide. In any of the embodiments, the first micron-sized carrier particles may include aluminum oxide. In any of the embodiments, the first micron-sized carrier particle may be pretreated at a temperature range of about 700° C. to about 1200° C. In any of the embodiments, the reductive catalyst nanoparticles may include rhodium. In any of the embodiments, the second support nanoparticles may include cerium zirconium oxide. In any of the embodiments, the second micron-sized carrier particle may include cerium zirconium oxide. In any of the embodiments, the support nanoparticles may have an average diameter of 10 nm to 20 nm. In any of the embodiments, the catalytic nanoparticles may have an average diameter of between 0.5 nm and 5 nm.

Any of the embodiments, may also include an oxygen storage component. In some of these embodiments, the oxygen storage component may be cerium zirconium oxide or cerium oxide.

Any of the embodiments, may also include a NOx absorber component. In some of the embodiments, the NOx absorber may be nano-sized BaO or micron-sized BaO. In some of the embodiments, the nano-sized BaO is impregnated into micron-sized alumina particles. In some of the embodiments, the NOx absorber may be both nano-sized BaO and micron-sized BaO. In some of the embodiments using nano-sized BaO impregnated into micron-sized alumina particles, the nano-sized BaO comprises about 10% by weight and the alumina comprises about 90% by weight. In some of the embodiments using nano-sized BaO impregnated into micron-sized alumina particles, the loading of the nano-sized BaO impregnated into micron-sized alumina particles can comprise about 5 g/l to about 40 g/l, about 10 g/l to about 35 g/l, about 10 g/l to about 20 g/l, or about 20 g/l to about 35 g/l, or about 16 g/l, or about 30 g/l on the final substrate. In some of the embodiments using nano-sized BaO impregnated into micron-sized alumina particles, the loading of the nano-sized BaO impregnated into micron-sized alumina particles can comprise about 5 times to 20 times the PGM loading on the substrate, about 8 times to 16 times the PGM loading on the substrate, or about 12 times to 15 times the PGM loading on the substrate. In some of the embodiments where 1.1 g/l PGM is loaded on the substrate, the nano-sized BaO impregnated into micron-sized alumina particles can comprise about 10 g/l to about 20 g/l, about 14 g/l to about 18 g/l, or about 16 g/l loading on the substrate. In some of the embodiments where 2.5 g/l PGM is loaded on the substrate, the nano-sized BaO impregnated into micron-sized alumina particles can comprise about 20 g/l to about 40 g/l, about 25 g/l to about 35 g/l, or about 30 g/l loading on the substrate.

In any of the embodiments, the substrate may include a cordierite or a metal substrate. In any of the embodiments, the substrate may include a grid array or foil structure.

In any of the embodiments of the coated substrate, the coated substrate may have a platinum group metal loading of 4 g/l or less and a light-off temperature for carbon monoxide at least 5° C. lower than the light-off temperature of a substrate with the same platinum group metal loading deposited by wet-chemistry methods.

In any of the embodiments of the coated substrate, the coated substrate may have a platinum group metal loading of 4 g/l or less and a light-off temperature for hydrocarbon at least 5° C. lower than the light-off temperature of a substrate with the same platinum group metal loading deposited by wet-chemistry methods.

In any of the embodiments of the coated substrate, the coated substrate may have a platinum group metal loading of 4 g/l or less and a light-off temperature for nitrogen oxide at least 5° C. lower than the light-off temperature of a substrate with the same platinum group metal loading deposited by wet-chemistry methods.

In any of the embodiments of the coated substrate, the coated substrate may have a platinum group metal loading of about 3.0 g/l to about 4.0 g/l. In any of the embodiments of the coated substrate, the coated substrate may have a platinum group metal loading of about 3.0 g/l to about 4.0 g/l, and after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

In any of the embodiments of the coated substrate, a ratio of oxidative catalytically active particles to reductive catalytically active particles is between 6:1 and 40:1.

A catalytic converter may include any of the embodiments of the coated substrate. An exhaust treatment system may include a conduit for exhaust gas and a catalytic converter including any of the embodiments of the coated substrate. A vehicle may include a catalytic converter including any of the embodiments of the coated substrate.

A method of treating an exhaust gas may include contacting the coated substrate of any of the embodiments of the coated substrate with the exhaust gas. A method of treating an exhaust gas may include contacting the coated substrate of any of the embodiments of the coated substrate with the exhaust gas, wherein the substrate is housed within a catalytic converter configured to receive the exhaust gas.

In some embodiments, a method of forming a coated substrate includes: a) coating a substrate with a washcoat composition including oxidative catalytically active particles; wherein the oxidative catalytically active particles include oxidative composite nanoparticles bonded to micron-sized carrier particles, and the oxidative composite nanoparticles include a first support nanoparticle and one or more oxidative catalyst nanoparticles; and b) coating the substrate with a washcoat composition including reductive catalytically active particles; wherein the reductive catalytically active particles include reductive composite nanoparticles bonded to micron-sized carrier particles, and the reductive composite nanoparticles include a second support nanoparticle and one or more reductive catalyst nanoparticles.

In some embodiments, a method of forming a coated substrate includes: a) coating a substrate with a washcoat composition including oxidative catalytically active particles and reductive catalytically active particles, wherein the oxidative catalytically active particles include oxidative composite nanoparticles bonded to micron-sized carrier particles, and the oxidative composite nanoparticles include a first support nanoparticle and one or more oxidative catalyst nanoparticle, and the reductive catalytically active particles include reductive composite nanoparticles bonded to micron-sized carrier particles, and the reductive composite nanoparticles include a second support nanoparticle and one or more reductive catalyst nanoparticle.

In some embodiments, a washcoat composition includes a solids content of: 25-75% by weight of oxidative catalytic active particles including composite oxidative nano-particles bonded to micron-sized carrier particles, and the composite oxidative nano-particles include a support nano-particle and a oxidative catalytic nano-particle; 5-50% by weight of reductive catalytic active particles including composite reductive nano-particles bonded to micron-sized carrier particles, and the composite reductive nano-particles include a support nano-particle and a reductive catalytic nano-particle; 1-40% by weight of micron-sized cerium zirconium oxide; 0.5-10% by weight of boehmite; and 1-25% by weight micron-sized $Al_2O_3$.

For all methods, systems, compositions, and devices described herein, the methods, systems, compositions, and devices can either comprise the listed components or steps, or can "consist essentially of" the listed components or steps. When a system, composition, or device is described as "consisting essentially of" the listed components, the system, composition, or device contains the components listed, and may contain other components which do not substantially affect the performance of the system, composition, or device, but either do not contain any other components which substantially affect the performance of the system, composition, or device other than those components expressly listed; or do not contain a sufficient concentration or amount of the extra components to substantially affect the performance of the system, composition, or device. When a method is described as "consisting essentially of" the listed steps, the method consists of the steps listed, and may contain other steps that do not substantially affect the outcome of the method, but the method does not contain any other steps which substantially affect the outcome of the method other than those steps expressly listed.

The systems, compositions, substrates, and methods described herein, including any embodiment of the invention as described herein, may be used alone or may be used in combination with other systems, compositions, substrates, and methods.

DETAILED DESCRIPTION

Figure 1:
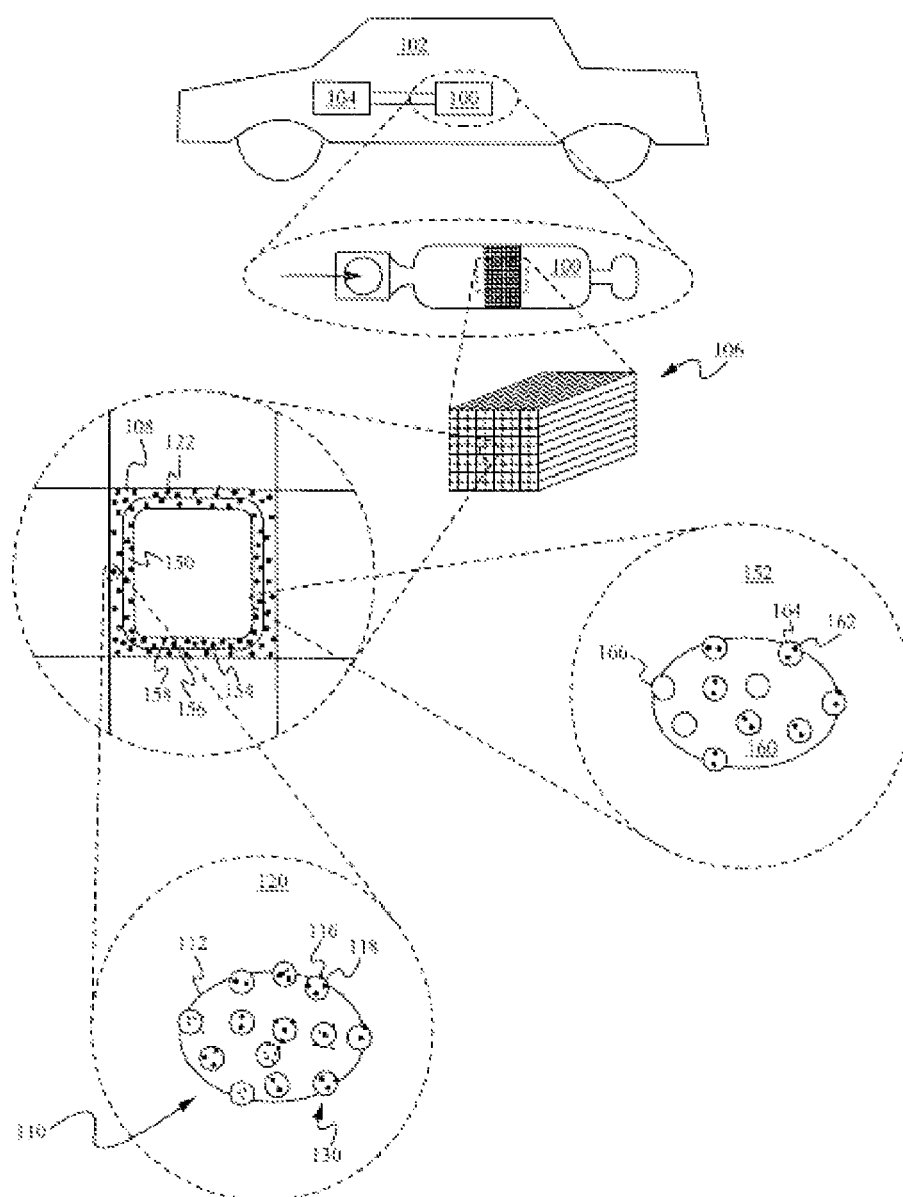
FIG. 1 shows a graphic illustration of a catalytic converter with a coated substrate comprising oxidative catalytically active particles and reductive catalytically active particles contained in separate washcoat layers in accordance with the present disclosure.

Described are three-way catalytic converters and methods of making the three-way catalytic converters by combining the washcoat layers that include both oxidative catalytically active particles and reductive catalytically active particles. Also described are composite nanoparticle catalysts, washcoat formulations, coated substrates, and catalytic converters, and methods of making and using these composite nanoparticle catalysts, washcoat formulations, coated substrates, and catalytic converters. The described three-way catalytic converters are more stable, and age less, than typical three-way catalytic converters that rely on wet chemistry methods. Accordingly, less precious metal oxidation and reduction catalyst may be used in these three-way catalytic converters.

In addition, the described substrates, composite nanoparticle catalysts and washcoat solutions provide for increased performance relative to prior catalysts and washcoat formulations when used to produce catalytic converters, allowing for the production of catalytic converters having reduced light-off temperatures, reduced emissions, and/or reduced platinum group metal loading requirements, as compared to catalytic converters having catalysts prepared using wet-chemistry methods. The described coated substrates include one or more washcoat layers in which the mobility of both the catalytically active oxidation and the catalytically active reduction particles are constrained when exposed to the high temperatures encountered in exhaust from gasoline engines. Because of this constrained mobility, the precious metals in the described layers are less likely to sinter or coalesce into larger metal particles and the reduction in catalytic activity as they age is reduced as compared to conventional three-way catalytic converters. These improvements result in the reduction of pollution released to the environment during the lifetime of the catalytic converter. In addition, less precious metal oxidation and reduction catalyst can be used to make an effective catalytic converter.

Composite nanoparticles include catalytic nanoparticles and support nanoparticles that are bonded together to form nano-on-nano composite nano particles. These composite nano particles are then bonded to a micron-sized carrier particle to form micron-sized catalytically active particles. The composite nano-particles may be produced, for example, in a plasma reactor so that consistent and tightly bonded nano-onnano composite particles are produced. These composite particles can then be bonded to micron-sized carrier particles to produce micron-sized catalytically active particles bearing composite nanoparticles, which may offer better initial (engine start-up) performance, better performance over the lifetime of the catalyst, and/or less decrease in performance over the life of the catalyst as compared to previous catalysts used in catalytic converters, such as catalysts prepared using wet-chemistry methods.

Further, the three-way catalytic converter can include one or more layers of washcoats on a catalyst substrate, such as a catalytic converter substrate. In some embodiments, the micron particles bearing composite oxidative nanoparticles and micron particles bearing composite reductive nanoparticles are in the same washcoat layer. In some embodiments, the micron particles bearing composite oxidative nanoparticles and micron particles bearing composite reductive nanoparticles are in separate washcoat layers. When the micron particles bearing composite oxidative nanoparticles and micron particles bearing composite reductive nanoparticles are in separate washcoat layers, the order and placement of these two layers on a substrate may vary in different embodiments and, in further embodiments, additional washcoat formulations/layers may also be used over, under, or between these washcoat layers, for example, a corner-fill washcoat layer which may be initially deposited on the substrate to be coated. In other embodiments, the two layers can be directly disposed on each other, that is, there are no intervening layers between the first and second washcoat layers. The described washcoat formulations may include a lower amount of platinum group metals and/or offer better performance when compared to previous washcoat formulations, particularly when these described washcoat formulations utilize the micron-sized particles bearing composite nanoparticles.

Various aspects of the disclosure can be described through the use of flowcharts. Often, a single instance of an aspect of the present disclosure is shown. As is appreciated by those of ordinary skill in the art, however, the protocols, processes, and procedures described herein can be repeated continuously or as often as necessary to satisfy the needs described herein. Additionally, it is contemplated that certain method steps can be performed in alternative sequences to those disclosed in the flowcharts.

When numerical values are expressed herein using the term "about" or the term "approximately," it is understood that both the value specified, as well as values reasonably close to the value specified, are included. For example, the description "about 50° C." or "approximately 50° C." includes both the disclosure of 50° C. itself, as well as values close to 50° C. Thus, the phrases "about X" or "approximately X" include a description of the value X itself. If a range is indicated, such as "approximately 50° C. to 60° C.," it is understood that both the values specified by the endpoints are included, and that values close to each endpoint or both endpoints are included for each endpoint or both endpoints; that is, "approximately 50° C. to 60° C." is equivalent to reciting both "50° C. to 60° C." and "approximately 50° C. to approximately 60° C."

By "substantial absence of any platinum group metals" it is meant that less than about 5%, less than about 2%, less than about 1%, less than about 0.5%, less than about 0.1%, less than about 0.05%, less than about 0.025%, or less than about 0.01% of platinum group metals are present by weight. Preferably, substantial absence of any platinum group metals indicates that less than about 1% of platinum group metals are present by weight.

By "substantially free of" a specific component, a specific composition, a specific compound, or a specific ingredient in various embodiments, is meant that less than about 5%, less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

It should be noted that, during fabrication, or during operation (particularly over long periods of time), small amounts of materials present in one washcoat layer may diffuse, migrate, or otherwise move into other washcoat layers. Accordingly, use of the terms "substantial absence of" and "substantially free of" is not to be construed as absolutely excluding minor amounts of the materials referenced.

By "substantially each" of a specific component, a specific composition, a specific compound, or a specific ingredient in various embodiments, it is meant that at least about 95%, at least about 98%, at least about 99%, at least about 99.5%, at least about 99.9%, at least about 99.95%, at least about 99.975%, or at least about 99.99% of the specific component, the specific composition, the specific compound, or the specific ingredient is present by number or by weight. Preferably, substantially each" of a specific component, a specific composition, a specific compound, or a specific ingredient is meant that at least about 99% of the specific component, the specific composition, the specific compound, or the specific ingredient is present by number or by weight.

This disclosure provides several embodiments. It is contemplated that any features from any embodiment can be combined with any features from any other embodiment. In this fashion, hybrid configurations of the disclosed features are within the scope of the present invention.

It is understood that reference to relative weight percentages in a composition assumes that the combined total weight percentages of all components in the composition add up to 100. It is further understood that relative weight percentages of one or more components may be adjusted upwards or downwards such that the weight percent of the components in the composition combine to a total of 100, provided that the weight percent of any particular component does not fall outside the limits of the range specified for that component.

This disclosure refers to both particles and powders. These two terms are equivalent, except for the caveat that a singular "powder" refers to a collection of particles. The present invention can apply to a wide variety of powders and particles. The terms "nano-particle," "nano-size particle," and "nano-sized particle" are generally understood by those of ordinary skill in the art to encompass a particle on the order of nanometers in diameter, typically between about 0.5 nm to 500 nm, about 1 nm to 500 nm, about 1 nm to 100 nm, or about 1 nm to 50 nm. Preferably, the nano-particles have an average grain size less than 250 nanometers and an aspect ratio between one and one million. In some embodiments, the nano-particles have an average grain size of about 50 nm or less, about 30 nm or less, or about 20 nm or less. In additional embodiments, the nano-particles have an average diameter of about 50 nm or less, about 30 nm or less, or about 20 nm or less. The aspect ratio of the particles, defined as the longest dimension of the particle divided by the shortest dimension of the particle, is preferably between one and one hundred, more preferably between one and ten, yet more preferably between one and two. "Grain size" is measured using the ASTM (American Society for Testing and Materials) standard (see ASTM E112-10). When calculating a diameter of a particle, the average of its longest and shortest dimension is taken; thus, the diameter of an ovoid particle with long axis 20 nm and short axis 10 nm would be 15 nm. The average diameter of a population of particles is the average of diameters of the individual particles, and can be measured by various techniques known to those of skill in the art.

In additional embodiments, the nano-particles have a grain size of about 50 nm or less, about 30 nm or less, or about 20 nm or less. In additional embodiments, the nano-particles have a diameter of about 50 nm or less, about 30 nm or less, or about 20 nm or less.

The terms "micro-particle," "micro-size particle," "micro-sized particle," "micron-particle," "micron-size particle," and "micron-sized particle" are generally understood to encompass a particle on the order of micrometers in diameter, typically between about 0.5 μm to 1000 μm, about 1 μm to 1000 μm, about 1 μm to 100 μm, or about 1 μm to 50 μm. Additionally, the term "platinum group metals" (abbreviated "PGM") used in this disclosure refers to the collective name used for six metallic elements clustered together in the periodic table. The six platinum group metals are ruthenium, rhodium, palladium, osmium, iridium, and platinum.

Composite Nanoparticle Catalyst

Three-way catalytic converters may be formed from two different types of composite nanoparticles. One type of composite nanoparticles is an oxidative composite nanoparticle. Another type of composite nanoparticle is a reductive composite nanoparticle.

A composite nanoparticle catalyst may include a catalytic nanoparticle attached to a support nanoparticle to form a "nano-on-nano" composite nanoparticle. Multiple nano-on-nano particles may then be bonded to a micron-sized carrier particle to form a composite micro/nanoparticle, that is, a micro-particle bearing composite nanoparticles. These composite micro/nanoparticles may be used in washcoat formulations and catalytic converters as described herein. The use of these particles can reduce requirements for platinum group metal content and/or significantly enhance performance, particularly in terms of reduced light-off temperature, as compared with currently available commercial catalytic converters prepared by wet-chemistry methods. This is particularly significant and striking for a three-way catalytic converter, which functions in the high temperature environment produced by a gasoline engine and includes both oxidation and reduction catalytically active particles. The wet-chemistry methods generally involve use of a solution of platinum group metal ions or metal salts, which are impregnated into supports (typically micron-sized particles), and reduced to platinum group metal in elemental form for use as the catalyst. For example, a solution of chloroplatinic acid, $H_2PtCl_6$, can be applied to alumina micro-particles, followed by drying and calcining, resulting in precipitation of platinum onto the alumina. The platinum group metals deposited by wet-chemical methods onto metal oxide supports, such as alumina and cerium zirconium oxide, are mobile at high temperatures, such as temperatures encountered in catalytic converters. That is, at the high temperatures of a three-way catalytic converter that is used for gasoline engines, the PGM atoms can migrate over the surface on which they are deposited, and will clump together with other PGM atoms. The finely-divided portions of PGM combine into larger and larger agglomerations of platinum group metal as the time of exposure to high temperature increases. This agglomeration leads to reduced catalyst surface area and degrades the performance of the catalytic converter. This phenomenon is referred to as "aging" of the catalytic converter.

In contrast, the composite platinum group metal catalysts are prepared by plasma-based methods. In one embodiment, the platinum group nano-sized metal particle is deposited on a nano-sized metal oxide support, which has much lower mobility than the PGM deposited by wet chemistry methods. The resulting plasma-produced catalysts age at a much slower rate than the wet-chemistry produced catalysts. Thus, catalytic converters using plasma-produced catalysts can maintain a larger surface area of exposed catalyst to gases emitted by the engine over a longer period of time, leading to better emissions performance.

Oxidative Composite Nanoparticle (Oxidative Nano-on-nano Particle)

As discussed above, one type of composite nanoparticles is an oxidative composite nanoparticle catalyst. An oxidative composite nanoparticle may include one or more oxidative catalyst nanoparticles attached to a first support nanoparticle to form an oxidative "nano-on-nano" composite nanoparticle. Platinum (Pt) and palladium (Pd) are oxidative to the hydrocarbon gases and carbon monoxide. In certain embodiments, the oxidative nanoparticle is platinum. In other embodiments, the oxidative nanoparticle is palladium. A suitable support nanoparticle for the oxidative catalyst nanoparticle includes, but is not limited to, nano-sized aluminum oxide (alumina or $Al_2O_3$).

Each oxidative catalyst nanoparticle may be supported on a first support nanoparticle. The first support nanoparticle may include one or more oxidative nanoparticles. The oxidative catalyst nanoparticles on the first support nanoparticle may include platinum, palladium, or a mixture thereof. At the high temperatures involved in gasoline exhaust engines both palladium and platinum are effective oxidative catalysts. Accordingly, in some embodiments, the oxidative catalyst is palladium alone, which is presently more widely available and less expensive. However, in some embodiments platinum alone may be used or in combination with palladium. For example, the first support nanoparticle may contain a mixture of 2:1 to 40:1 palladium to platinum.

Reductive Composite Nanoparticle (Reductive Nano-on-nano Particle)

As discussed above, another type of composite nanoparticles is a reductive composite nanoparticle catalyst. A reductive composite nanoparticle may include one or more reductive catalyst nanoparticles attached to a second support nanoparticle to form a reductive "nano-on-nano" composite nanoparticle. Rhodium (Rh) is reductive to the nitrogen oxides in fuel-rich conditions. In certain embodiments, the reductive catalyst nanoparticle is rhodium. The second support may be the same or different than the first support. A suitable second support nanoparticle for the reductive nano-particle includes, but is not limited to, nano-sized cerium zirconium oxide ($CeO_2.ZrO_2$).

Each reductive catalyst nanoparticle may be supported on a second support nanoparticle. The second support nanoparticle may include one or more reductive catalyst nanoparticles. The ratios of rhodium to cerium zirconium oxide and sizes of the reductive composite nanoparticle catalyst are further discussed below in the sections describing production of composite nanoparticles by plasma-based methods and production of micron-sized carrier particles bearing composite nanoparticles.

Barium-Oxide Nano-particles and Micron-particles

Barium oxide nanoparticles may be combined with porous micron supports as described below, and may be included in the oxidative washcoat layer, the reductive washcoat layer, or both the oxidative and reductive washcoat layers. As an alternative embodiment, micron-sized barium oxide particles may be included in the oxidative washcoat layer, the reductive washcoat layer, or both the oxidative and reductive washcoat layers. In another alternative embodiment, both barium oxide nanoparticles and barium oxide micron particles may be included in the oxidative washcoat layer, the reductive washcoat layer, or both the oxidative and reductive washcoat layers. When the oxidative and reductive particles are in the same layer, barium-oxide nanoparticles and/or barium-oxide micron particles may be included in this combination layer.

The barium oxide is an absorber that binds and holds NOx compounds, particularly $NO_2$, and sulfur compounds such $SO_x$, particularly $SO_2$, during lean burn times of engine operation. These compounds are then released and reduced by the catalysts during a period of rich engine operation.

Production of Composite Nanoparticles by Plasma-based Methods ("Nano-on-nano" Particles or "NN" Particles)

The oxidative composite nanoparticle catalysts and reductive composite nanoparticle catalysts are produced by plasma-based methods. These particles have many advantageous properties as compared to catalysts produced by wet chemistry. For example, the precious metals in the composite nanoparticle catalysts are relatively less mobile under the high temperature environment of a three-way catalytic converter than the precious metals in washcoat mixtures used in typical commercial three-way catalytic converters that are produced using wet chemistry methods.

Both the oxidative composite nanoparticles and the reductive composite nanoparticles may be formed by plasma reactor methods. These methods include feeding platinum group metal(s) and support material into a plasma gun, where the materials are vaporized. Plasma guns such as those disclosed in US 2011/0143041 can be used, and techniques such as those disclosed in U.S. Pat. Nos. 5,989,648, 6,689,192, 6,755,886, and US 2005/0233380 can be used to generate plasma. A working gas, such as argon, is supplied to the plasma gun for the generation of plasma; in one embodiment, an argon/hydrogen mixture (in the ratio of 10:2 $Ar/H_2$) may be used as the working gas.

The platinum group metal or metals (such as rhodium, palladium, platinum, or platinum/palladium in any ratio, such as 2:1 up to 40:1 platinum:palladium by weight), generally in the form of metal particles of about 1 to 6 microns in diameter, can be introduced into the plasma reactor as a fluidized powder in a carrier gas stream such as argon. Metal oxide, typically aluminum oxide or cerium zirconium oxide in a particle size of about 15 to 25 microns diameter, is also introduced as a fluidized powder in carrier gas. However, other methods of introducing the materials into the reactor can be used, such as in a liquid slurry. Typically, for oxidative composite nanoparticles, palladium, platinum, or a mixture thereof is deposited on aluminum oxide. Typically, for reductive composite nanoparticles, rhodium is deposited on cerium zirconium oxide.

For preparation of oxidative composite nanoparticles, a composition of 1% to 5% platinum group metal(s) and 55% to 99% metal oxide (by weight) is typically used. Examples of ranges of materials that can be used for oxidative composite nanoparticles in which palladium is the oxidation catalyst are from about 1% to 20% palladium, to 80% to 99% aluminum oxide; and 5%-20% palladium to 80%-95% aluminum oxide. Examples of ranges of materials that can be used for oxidative composite nanoparticles in which platinum is the oxidation catalyst are from about 35% to 45% platinum to 55% to 65% aluminum oxide. Examples of ranges of materials that can be used for oxidative composite nanoparticles in which both platinum and palladium are the oxidation catalyst are from about 23.3% to about 30% platinum, 11.7% to 15% palladium, and 55% to 65% aluminum oxide. In a certain embodiment, a composition contains about 26.7% platinum, 13.3% palladium, and 60% aluminum oxide.

Examples of ranges of materials that can be used for reductive composite nanoparticles are from about 1% to about 10% rhodium and 90% to 99% cerium zirconium oxide. In a certain embodiment, the composition contains about 5% rhodium and 95% cerium zirconium oxide.

In a plasma reactor, any solid or liquid materials are rapidly vaporized or turned into plasma. The kinetic energy of the superheated material, which can reach temperatures of 20,000 to 30,000 Kelvin, ensures extremely thorough mixture of all components.

The superheated material of the plasma stream is then quenched rapidly; using such methods as the turbulent quench chamber disclosed in US 2008/0277267. Argon quench gas at high flow rates, such as 2400 to 2600 liters per minute, may be injected into the superheated material. The material may be further cooled in a cool-down tube, and collected and analyzed to ensure proper size ranges of material.

The plasma production method described above produces highly uniform composite nanoparticles, where the composite nanoparticles comprise a catalytic nanoparticle bonded to a support nanoparticle. The catalytic nanoparticle comprises the platinum group metal or metals, such as Pd, Pt, or Rh. In some embodiments, the catalytic nanoparticles have an average diameter or average grain size between approximately 0.3 nm and approximately 10 nm, preferably between approximately 1 nm to approximately 5 nm, that is, approximately 3 nm+/−2 nm. In some embodiments, the support nanoparticles, comprising the metal oxide such as aluminum oxide or cerium zirconium oxide, have an average diameter of approximately 20 nm or less, or approximately 15 nm or less, or between approximately 10 nm and approximately 20 nm, that is, approximately 15 nm+/−5 nm, or between approximately 10 nm and approximately 15 nm, that is, approximately 12.5 nm+/−2.5 nm. In some embodiments, the support nano-particles, comprising the metal oxide such as aluminum oxide or cerium zirconium oxide, have a diameter of approximately 20 nm or less, or approximately 15 nm or less, or between approximately 10 nm and approximately 20 nm, that is, approximately 15 nm+/−5 nm, or between approximately 10 nm and approximately 15 nm, that is, approximately 12.5 nm+/−2.5 nm.

The Pd-alumina, Pt-alumina, and Pt/Pd-alumina composite nanoparticles, when produced under reducing conditions, such as by using argon/hydrogen working gas, results in a partially reduced alumina surface on the support nano-particle to which the PGM nano-particle is bonded, as described in US 2011/0143915 at paragraphs 0014-0022. The partially reduced alumina surface, or $Al_2O_{(3-x)}$ where x is greater than zero, but less than three, inhibits migration of the platinum group metal on the alumina surface at high temperatures. This in turn limits the agglomeration of platinum group metal when the particles are exposed to prolonged elevated temperatures. Such agglomeration is undesirable for many catalytic applications, as it reduces the surface area of PGM catalyst available for reaction.

The composite nanoparticles comprising two nanoparticles (catalytic or support) are referred to as "nano-on-nano" particles or "NN" particles.

Production of Micron-sized Carrier Particles Bearing Composite Nanoparticles ("Nano-on-nano-on-micro" Particles or "NNm"™ Particles)

The composite nanoparticles (nano-on-nano particles) may be further bonded to micron-sized carrier particles to produce composite micro/nanoparticles, referred to as "nanoon-nano-on-micro" particles or "NNm"™ particles, which are catalytically active particles.

An oxidative catalytically active particle includes an oxidative catalyst nanoparticle (such as palladium, platinum or a mixture thereof) and nano-sized metal oxide (such as nano-sized aluminum oxide or nano-sized cerium zirconium oxide) which are bonded to a micron-sized carrier particle (such as micron-sized aluminum oxide or micron-sized cerium zirconium oxide). A reductive catalytically active particle includes a reductive catalyst nanoparticle (such as rhodium) and a nano-sized metal oxide (such as nano-sized cerium zirconium oxide) which are bonded to micron-sized carrier particles (such as micron-sized cerium zirconium oxide).

The micron-sized particles can have an average size between about 1 micron and about 100 microns, such as between about 1 micron and about 10 microns, between about 3 microns and about 7 microns, or between about 4 microns and about 6 microns.

In general, the nano-on-nano-on-micro particles are produced by a process of suspending the composite nanoparticles (nano-on-nano particles) in water, adjusting the pH of the suspension to between about 2 and about 7, between about 3 and about 5, or about 4, adding one or more surfactants to the suspension (or, alternatively, adding the surfactants to the water before suspending the composite nano-particles in the water) to form first solution. The process includes sonicating the composite nanoparticle suspension, applying the suspension to micron-sized metal oxide particles until the point of incipient wetness, thereby impregnating the micron-sized particles with composite nanoparticles and nano-sized metal oxide.

In some embodiments, the micron-sized metal oxide particles are pre-treated with a gas at high temperature. The pretreatment of the micron-sized metal oxide particles allows the nano-on-nano-on-micro particles to withstand the high temperatures of an engine. Without pretreatment, the nano-on-nano-on-micro particles would more likely change phase on exposure to high temperature compared to the nano-on-nano-on-micro particles that have been pretreated. In some embodiments, pretreatment includes exposure of the micron-sized metal oxide particles at temperatures, such as about 700° C. to about 1500° C.; 700° C. to about 1400° C.; 700° C. to about 1300° C.; and 700° C. to about 1200° C. In some embodiments, pretreatment includes exposure of the micron-sized metal oxide particles at temperatures, such as about 700° C., 1110° C., 1120° C., 1130° C., 1140° C., 1150° C., 1155° C., 1160° C., 1165° C., 1170° C., 1175° C., 1180° C., 1190° C., and 1200° C.

The process includes drying the micron-sized metal oxide particles which have been impregnated with composite nanoparticles and nano-sized metal oxide, and calcining the micron-sized metal oxide particles which have been impregnated with composite nanoparticles and nano-sized metal oxide.

Typically, the composite nanoparticles and nano-sized metal oxide are suspended in water, and the suspension is adjusted to have a pH of between about 2 and about 7, preferably between about 3 and about 5, more preferably a pH of about 4 (the pH is adjusted with acetic acid or another organic acid). Dispersants and/or surfactants may be added to the composite nanoparticles and nano-sized metal oxide. Surfactants suitable for use include Jeffsperse® X3202 (Chemical Abstracts Registry No. 68123-18-2, and described as 4,4'-(1-methylethylidene)bis-phenol polymer with 2-(chloromethyl)oxirane, 2-methyloxirane, and oxirane), Jeffsperse® X3204, and Jeffsperse® X3503 surfactants from Huntsman (JEFFSPERSE is a registered trademark of Huntsman Corporation, The Woodlands, Tex., United States of America for chemicals for use as dispersants and stabilizers), which are nonionic polymeric dispersants. Other suitable surfactants include Solsperse® 24000 and Solsperse® 46000 from Lubrizol (SOLSPERSE is a registered trademark of Lubrizol Corporation, Derbyshire, United Kingdom for chemical dispersing agents). The Jeffsperse® X3202 surfactant, Chemical Abstracts Registry No. 68123-18-2 (described as 4,4'-(1-methylethylidene)bis-phenol polymer with 2-(chloromethyl)oxirane, 2-methyloxirane, and oxirane), is preferred. The surfactant may be added in a range, for example, of about 0.5% to about 5%, with about 2% being a typical value.

The mixture of aqueous surfactants and composite nanoparticles and nano-sized metal oxide may be sonicated to disperse the composite nanoparticles and nano-sized metal oxide. The quantity of composite nanoparticles and nano-sized metal oxide in the dispersion may be in the range of about 2% to about 15% (by mass).

General Procedures for Preparation of Catalysts for Oxidation Reaction

To prepare an oxidative catalytically active particle, a dispersion of oxidative composite nanoparticles may be applied to porous, micron-sized $Al_2O_3$, which may be purchased, for example, from companies such as Rhodia or Sasol. The porous, micron-sized, $Al_2O_3$ powders may be stabilized with a small percentage of lanthanum (about 2% to about 4% La). One commercial alumina powder suitable for use is MI-386, which may be purchased from Grace Davison or Rhodia. The usable surface for this powder, defined by pore sizes greater than 0.28 μ is approximately 2.8 m$^2$/g. The ratio of composite nano-particles used to micron-sized carrier particles used may be from about 3:100 to about 10:100, about 5:100 to about 8:100, or about 6.5:100, in terms of (weight of composite nanoparticle):(weight of micron carrier particle). In some embodiments, about 8 grams of composite nano-particles may be used with about 122 grams of carrier microparticles. The aqueous dispersion of composite nanoparticles may be applied in small portions (such as by dripping or other methods) to the micron-sized powder until the point of incipient wetness, producing a material similar to damp sand as described below.

In some instances, the sizes of the nano-sized oxidative catalysts, for example Pd, Pt or Pt/Pd are about 1 nm and the sizes of the nano-sized $Al_2O_3$ are about 10 nm. In some instances, the sizes of the nano-sized oxidative catalysts are approximately 1 nm or less and the sizes of the nano-sized $Al_2O_3$ are approximately 10 nm or less. In some instances, Pd is used as the oxidative catalyst and the weight ratio of nano-sized Pd:nano-sized $Al_2O_3$ is about 5%:95%. In some instances, the weight percentage of nano-sized Pd is between about 5% to about 20% of nano-sized Pd on nano-sized $Al_2O_3$. The nano-on-nano material that contains nano-sized Pd on nano-sized $Al_2O_3$ shows a dark black color. In some instances, Pt is used as the oxidative catalyst and the weight ratio of nano-sized Pt:nano-sized $Al_2O_3$ is about 40%:60%.

A solution containing dispersed nano-on-nano material can be prepared by sonication process to disperse nano-on-nano particles into water with pH ~4. Then 100 g of micron-sized MI386 $Al_2O_3$ is put into a mixer, and 100 g dispersion containing the nano-on-nano material is injected into the mixing $Al_2O_3$, which is known as incipient wetness process.

Next, the wet powder is dried at 60° C. in a convection oven overnight until it is fully dried.

Next, calcination is performed. The dried powder from the previous step, that is, the nanomaterials on the micron-sized material, is baked at 550° C. for two hours under ambient air condition. During the calcination, the surfactant is burned off and the nanomaterials are glued or fixed onto the surface of the micron-materials or the surface of the pores of the micron-materials. One explanation for why the nanomaterials can be glued or fixed more permanently onto the micron-material during the calcination is because oxygen-oxygen (O—O) bonds, oxide-oxide bonds, or covalent bonds are formed during the calcination. The oxide-oxide bonds can be formed between the nanomaterials (nano-on-nano with nano-on-nano, nano-on-nano with nano-sized $Al_2O_3$, and nano-sized $Al_2O_3$ with nano-sized $Al_2O_3$), between the nanomaterials and the micron-materials, and between the micron-materials themselves. The oxide-oxide bond formation is sometimes referred to as a solid state reaction. At this stage, the material produced contains a micron-particle based material having nano-on-nano and n-$Al_2O_3$ randomly distributed on the surface.

The oxidative NNm™ particles may contain from about 0.5% to about 5% palladium by weight, or in another embodiment from about 1% to 3% by weight, or in another embodiment, about 1.2% to 2.5% by weight, of the total mass of the NNm™ particle.

The oxidative NNm™ particles may contain from about 1% to about 6% platinum by weight, of the total mass of the NNm™ particle.

General Procedures for Preparation of Catalysts for Reduction Reaction

To prepare a reductive catalytically active particle, a dispersion of reductive composite nanoparticles may be applied to porous, micron-sized cerium zirconium oxide. A preferred reductive PGM is rhodium.

The micron-sized carrier particles, impregnated with the composite reductive nanoparticles and nano-sized metal oxide, may then be dried (for example, at about 30° C. to about 95° C., preferably about 60° C. to about 70° C., at atmospheric pressure or at reduced pressure such as from about 1 pascal to about 90,000 pascal). After drying, the particles may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon) to yield the composite micro/nano-particles, also referred to as nano-on-nano-on-micro particles, or NNm™ particles. The drying step may be performed before the calcining step to remove the water before heating at the higher calcining temperatures; this avoids boiling of the water, which would disrupt the impregnated nano-particles which are lodged in the pores of the micron-sized carrier.

The catalyst for reduction reactions can be made using the procedures similar to the procedure of making the catalyst for oxidation reactions. The nano-on-nano materials, nano-sized Rh on nano-sized cerium zirconium oxide, can be obtained and prepared using the method described above. In some instances, the sizes of the nano-sized Rh are about 1 nm and the sizes of the nano-sized cerium zirconium oxide are about 10 nm. In some instances, the sizes of the nano-sized Rh are approximately 1 nm or less and the sizes of the nano-sized cerium zirconium oxide are approximately 10 nm or less. In some instances, the weight ratio of nano-sized Rh:nano-sized cerium zirconium oxide is about 5%:95%. In some instances, the weight percentage of nano-sized Rh is between about 5% to about 20% nano-sized Rh on nano-sized cerium zirconium oxide.

Next, calcination can be performed. The dried powder from the previous step, that is, the nanomaterials on the micron-sized material, can be baked at 550° C. for two hours under ambient air condition. During the calcination, the surfactant is evaporated and the nanomaterials are glued or fixed onto the surface of the micron-materials or the surface of the pores of the micron-materials. At this stage, the material produced (a catalytic active material) contains a micron-particle based material (micron-sized cerium zirconium oxide) having nano-on-nano (nano-sized Rh on nano-sized cerium zirconium oxide) and nano-sized cerium zirconium oxide randomly distributed on the surface.

The reductive NNm™ particles may contain from about 0.1% to 1.0% rhodium by weight, or in another embodiment from about 0.2% to 0.5% by weight, or in another embodiment, about 0.3% by weight, of the total mass of the NNm™ particle. The NNm™ particles can then be used for formulations for coating substrates, where the coated substrates may be used in catalytic converters.

Examples of production of NNm™ material are described in the following co-owned patents and patent applications, the disclosures of which are hereby incorporated by reference in their entirety: U.S. Patent Publication No. 2005/0233380, U.S. Patent Publication No. 2006/0096393, U.S. patent application Ser. Nos. 12/151,810, 12/152,084, 12/151,809, U.S. Pat. No. 7,905,942, U.S. patent application Ser. No. 12/152,111, U.S. Patent Publication 2008/0280756, U.S. Patent Publication 2008/0277270, U.S. patent application Ser. Nos. 12/001,643, 12/474,081, 12/001,602, 12/001,644, 12/962,518, 12/962,473, 12/962,490, 12/969,264, 12/962,508, 12/965,745, 12/969,503, and 13/033,514, WO 2011/081834 (PCT/US2010/59763) and US 2011/0143915 (U.S. patent application Ser. No. 12/962,473).

NNm™ Particles with Inhibited Migration of Platinum Group Metals

The oxidative NNm™ particles including an aluminum oxide micron-sized carrier particle bearing composite nano-particles, where the composite nano-particles are produced under reducing conditions, are particularly advantageous for use in catalytic converter applications. The platinum group metal of the catalytic nano-particle has a greater affinity for the partially reduced $Al_2O_{(3-x)}$ surface of the support nanoparticle than for the $Al_2O_3$ surface of the micron-sized carrier particles. Thus, at elevated temperatures, neighboring PGM nanoparticles bound to neighboring $Al_2O_{(3-x)}$ support nanoparticles are less likely to migrate on the $Al_2O_3$ micron-sized carrier particle surface and agglomerate into larger catalyst clumps. Since the larger agglomerations of catalyst have less surface area, and are less effective as catalysts, the inhibition of migration and agglomeration provides a significant advantage for the NNm™ particles. In contrast, palladium and platinum particles deposited by wet-chemical precipitation onto alumina support demonstrate higher mobility and migration, forming agglomerations of catalyst and leading to decreased catalytic efficacy over time (that is, catalyst aging).

Barium-Oxide Particles

Barium-oxide nano particles and barium-oxide micron particles may be produced by the plasma-based methods described above with respect to the oxidative and reductive nano-on-nano particles. The barium-oxide feed material can be fed into the into a plasma gun, where the material is vaporized.

In some embodiments, the barium-oxide nanoparticles have an average diameter of approximately 20 nm or less, or approximately 15 nm or less, or between approximately 10 nm and approximately 20 nm, that is, approximately 15 nm+/−5 nm, or between approximately 10 nm and approximately 15 nm, that is, approximately 12.5 nm+/−2.5 nm. In some embodiments, the barium-oxide nano-particles have a diameter of approximately 20 nm or less, or approximately 15 nm or less, or between approximately 10 nm and approximately 20 nm, that is, approximately 15 nm+/−5 nm, or between approximately 10 nm and approximately 15 nm, that is, approximately 12.5 nm+/−2.5 nm.

In some embodiments, the barium-oxide micron particles have an average diameter of approximately 10 μm or less, or approximately 8 μm or less, or approximately 5 μm or less, or approximately 2 μm or less, or approximately 1.5 μm or less, or approximately 1 μm or less, or approximately 0.5 μm or less. In some embodiments, the barium-oxide micron particles have an average diameter between approximately 6 μm and approximately 10 μm, that is, approximately 8 μm+/−2 μm, or between approximately 7 μm and approximately 9 μm, that is, approximately 8 μm+/−1 μm. In some embodiments, the barium-oxide micron particles have an average diameter between approximately 0.5 μm and approximately 2 μm, that is, approximately 1.25 μm+/−0.75 μm, or between approximately 1.0 μm and approximately 1.5 μm, that is, approximately 1.25 μm+/−0.25 μm.

The barium-oxide nano particles may be impregnated into micron-sized alumina supports. The procedure for impregnating these supports may be similar to the process described above with respect to impregnating the oxidative composite nanoparticles into micron-sized $Al_2O_3$ supports. Preferably, the barium-oxide nano-particles are prepared by applying a dispersion of barium-oxide nanoparticles to porous, micron-sized $Al_2O_3$, as described with respect to the oxidative nanoparticles. The porous, micron-sized, $Al_2O_3$ powders may be stabilized with a small percentage of lanthanum (about 2% to about 4% La). One commercial alumina powder suitable for use is MI-386.

Exemplary ranges for the nano-sized BaO-alumina ratio include 1-20% BaO to 80% to 99% aluminum oxide micron support; 2-15% BaO to 85% to 98% aluminum oxide micron support; 5%-12% BaO to 88% to 95% aluminum oxide micron support; and about 10% BaO to about 90% aluminum oxide micron support, expressed as weight percentages. In one embodiment, the nano-BaO-impregnated aluminum oxide comprises 10%, or about 10%, nano-BaO by weight and 90%, or about 90%, aluminum oxide by weight.

Barium-oxide micron particles are used simply by adding them to the washcoat when desired, in the amount desired, along with the other solid ingredients.

Substrates

The initial substrate is preferably a catalytic converter substrate that demonstrates good thermal stability, including resistance to thermal shock, and to which the described washcoats can be affixed in a stable manner. Suitable substrates include, but are not limited to, substrates formed from cordierite or other ceramic materials, and substrates formed from metal. The substrates may include a grid array structure, or coiled foil structure, which provides numerous channels and results in a high surface area. The high surface area of the coated substrate with its applied washcoats in the catalytic converter provides for effective treatment of the exhaust gas flowing through the catalytic converter.

A corner fill layer, or a buffer layer or adhesion layer such as a thin Boehmite layer, may be applied to the substrate prior to applying any of the active washcoat layers, but is not required. The cordierite substrates used for gasoline engines using a three way washcoat typically has about 900 channels per square inch (cpsi), with a 2.5 mil wall thickness.

Washcoat Comprising Nano-on-Nano-on-Micro Particles

The catalytically active particles bound to support particles and can be applied to a substrate of a catalytic converter as part of a washcoat. The catalytically active particles are reactive to different gases in the exhausts. For example, catalytically active particles containing platinum or palladium nanoparticles are oxidative to the hydrocarbon gases and carbon monoxide and catalytically active particles containing rhodium are reductive to the nitrogen oxides.

The washcoat may contain oxidative nanoparticles, reductive nanoparticles or both oxidative nanoparticles and reductive nanoparticles. A washcoat containing oxidative nanoparticles on micron supports or reductive nanoparticles on micron supports may be used to coat a substrate such that the oxidative catalytically active particles bearing composite nanoparticles and reductive catalytically active particles bearing composite nanoparticles are in separate washcoat layers on a substrate. In alternative embodiments, a washcoat containing oxidative nanoparticles on micron supports and reductive nanoparticles on micron supports may be used to coat a substrate such that the oxidative catalytically active particles bearing composite nanoparticles and reductive catalytically active particles bearing composite nanoparticles are in the same layer on a substrate.

The washcoat layers can include materials that are less active or inert to exhausts. Such materials can be incorporated as supports for the reactive catalysts or to provide surface area for the precious metals. In some embodiments, the catalyst-containing washcoat composition further includes "spacer" or "filler" particles, where the spacer particles may, for example, be ceramic, metal oxide, or metallic particles. In some embodiments, the spacer particles may be alumina or boehmite.

In certain embodiments, the washcoat layer can contain an oxygen storage component. An oxygen storage component has oxygen storage capacity with which the catalyst can accumulate oxygen when exhaust gas is in an oxygen-excess state (oxidative atmosphere), and releases the accumulated oxygen when exhaust gas is in a oxygen-deficient state (reductive atmosphere). With an oxygen storage component, carbon monoxide and hydrocarbons can be efficiently oxidized to $CO_2$ even in an oxygen-deficient state. Materials such as cerium oxide ($CeO_2$, also referred to as "ceria") and cerium zirconium oxide ($CeO_2$—$ZrO_2$) can be used as oxygen storage components. In some embodiments, micron-sized cerium zirconium oxide is included in the washcoat as an oxygen storage component.

In certain embodiments, the washcoat layer can contain an absorber to bind $NO_x$ and $SO_x$ compounds. In some embodiments, the nano barium-oxide particles or micron-sized barium-oxide particles used with the alumina supports are included in the washcoat as an absorber.

In the following descriptions, the percentages of the components of the washcoat compositions are provided in terms of the amount of solids present in the washcoat compositions, as the washcoat compositions can be provided in an aqueous suspension or, in some instances, as dry powder. The catalyst layer (or catalyst-containing layer) refers to the catalyst-containing washcoat composition after it has been applied to the substrate, dried, and calcined. The catalyst layer referred to herein encompasses a layer including oxidative catalytically active particles or a layer including reductive catalytically active particles or a washcoat layer including oxidative catalytically active particles and reductive catalytically active particles.

The following Table 1 provides embodiments of different washcoat layer configurations:

TABLE 1

| Washcoat Configurations | |
|---|---|
| Two-layer washcoat configurations-separate oxidation and reduction washcoat layers Two-layer washcoat configuration using alumina filler without BaO | One-layer washcoat configurations-combined oxidation and reduction washcoat layer One layer washcoat configuration using alumina filler without BaO |
| 1a) Substrate-Oxidizing Washcoat Layer-Reducing Washcoat Layer (MI-386 alumina filler without BaO) 1b) Substrate-Reducing Washcoat Layer-Oxidizing Washcoat Layer (MI-386 alumina filler without BaO) | 5) Substrate-Combined Oxidizing/Reducing Washcoat Layer (MI-386 alumina filler without BaO) |
| Two-layer washcoat configuration using nano-BaO-bearing alumina filler | One-layer washcoat configuration using nano-BaO-bearing alumina filler |
| 2a) Substrate-Oxidizing Washcoat Layer-Reducing Washcoat Layer (nano-BaO-bearing MI-386 alumina filler) 2b) Substrate-Reducing Washcoat Layer-Oxidizing Washcoat Layer (nano-BaO-bearing MI-386 alumina filler) | 6) Substrate-Combined Oxidizing/Reducing Washcoat Layer (nano-BaO-bearing MI-386 alumina filler) |
| Two-layer washcoat configuration using micron-BaO mixed with alumina filler | One-layer washcoat configuration using micron-BaO mixed with alumina filler |
| 3a) Substrate-Oxidizing Washcoat Layer-Reducing Washcoat Layer (micron-BaO mixed with MI-386 alumina filler) 3b) Substrate-Reducing Washcoat Layer-Oxidizing Washcoat Layer (micron-BaO mixed with MI-386 alumina filler) | 7) Substrate-Combined Oxidizing/Reducing Washcoat Layer (micron-BaO mixed with MI-386 alumina filler) |
| Two-layer washcoat configuration using alumina filler with nano-BaO and with admixed micron-BaO | One-layer washcoat configuration using alumina filler with both nano-BaO and micron-BaO |
| 4a) Substrate-Oxidizing Washcoat Layer-Reducing Washcoat Layer (admixed micron-BaO and/or nano-BaO-bearing MI-386 alumina filler) 4b) Substrate-Reducing Washcoat Layer-Oxidizing Washcoat Layer (admixed micron-BaO and/or nano-BaO-bearing MI-386 alumina filler) | 8) Substrate-Combined Oxidizing/Reducing Washcoat Layer (admixed micron-BaO and nano-BaO-bearing MI-386 alumina filler) |

Two Layer Washcoat Configurations-separate Oxidation and Reduction Washcoat Layers Oxidation Washcoat Components In some embodiments, the oxidizing washcoat layer in the two layer configurations (configurations 1a, 1b, 3a and 3b in Table 1) comprises, consists essentially of, or consists of oxidizing nano-on-nano-on-micro (NNm™) particles, cerium-zirconium oxide particles, boehmite particles, and alumina filler/sealant particles with or without BaO (for example MI-386). The composition of the oxidizing washcoat components and the reducing washcoat components may be as described below regardless of the order in which the washcoats are deposited.

In some embodiments, the NNm™ particles make up between approximately 35% to approximately 75% by weight of the combination of the NNm™ particles, cerium-zirconium oxide particles, boehmite particles, and alumina filler/sealant particles. In some embodiments, the NNm™ particles make up between approximately 45% to approximately 65% by weight of the combination of the NNm™ particles, cerium-zirconium oxide particles, boehmite particles, and alumina filler/sealant particles. In some embodiments, the NNm™ particles make up between approximately 50% to approximately 60% by weight of the combination of the NNm™ particles, cerium-zirconium oxide particles, boehmite particles, and alumina filler/sealant particles. In some embodiments, the NNm™ particles make up about 55% by weight of the combination of the NNm™ particles, cerium-zirconium oxide particles, boehmite particles, and alumina filler/sealant particles. Preferably, the catalytically active particle in the oxidizing NNm™ particles is palladium at a loading of 1.5-2 wt % in the NNm™ particles. Palladium, platinum and platinum and palladium/platinum mixtures may also be used in the loadings described previously.

The micron-sized porous cerium-zirconium oxide particles described with respect to the reducing NNm™ support particles may be used for the micron-sized porous cerium-zirconium oxide component in the oxidizing washcoat formulation. In some embodiments, the micron-sized porous cerium-zirconium oxide particles make up between approximately 5% to approximately 25% by weight of the combination of the NNm™ particles, cerium-zirconium oxide particles, boehmite particles, and alumina filler/sealant particles. In some embodiments, the micron-sized porous cerium-zirconium oxide particles make up between approximately 10% to approximately 20% by weight of the combination of the NNm™ particles, cerium-zirconium oxide particles, boehmite particles, and alumina filler/sealant particles. In some embodiments, the micron-sized porous cerium-zirconium oxide particles make up between approximately 12% to approximately 17% by weight of the combination of the NNm™ particles, cerium-zirconium oxide particles, boehmite particles, and alumina filler/sealant particles. In some embodiments, the micron-sized porous cerium-zirconium oxide particles make up about 15% by weight of the combination of the NNm™ particles, cerium-zirconium oxide particles, boehmite particles, and alumina filler/sealant particles.

In some embodiments, the boehmite particles make up between approximately 0.5% to approximately 10% by weight of the combination of the NNm™ particles, cerium-zirconium oxide particles, boehmite particles, and alumina filler/sealant particles. In some embodiments, the boehmite particles make up between approximately 1% to approximately 7% by weight of the combination of the NNm™ particles, cerium-zirconium oxide particles, boehmite particles, and alumina filler/sealant particles. In some embodiments, the boehmite particles make up between approximately 2% to approximately 5% by weight of the combination of the NNm™ particles, cerium-zirconium oxide particles, boehmite particles, and alumina filler/sealant particles. In some embodiments, the boehmite particles make up about 3% by weight of the combination of the NNm™ particles, cerium-zirconium oxide particles, boehmite particles, and alumina filler/sealant particles.

In some embodiments, the alumina filler/sealant particles make up between approximately 10% to approximately 40% by weight of the combination of the NNm™ particles, cerium-zirconium oxide particles, boehmite particles, and alumina filler/sealant particles. In some embodiments, the alumina filler/sealant particles make up between approximately 20% to approximately 35% by weight of the combination of the NNm™ particles, cerium-zirconium oxide particles, boehmite particles, and alumina filler/sealant particles. In some embodiments, the alumina filler/sealant particles make up between approximately 25% to approximately 30% by weight of the combination of the NNm™ particles, cerium-zirconium oxide particles, boehmite particles, and alumina filler/sealant particles. In some embodiments, the alumina filler/sealant particles make up about 27% by weight of the combination of the NNm™ particles, cerium-zirconium oxide particles, boehmite particles, and alumina filler/sealant particles. The alumina filler/sealant particles may be porous lanthanum-stabilized alumina, for example MI-386. In some embodiments, a different filler particle may be used in place of some or all of the alumina particles.

In the oxidizing washcoat from 0 to 100% of the alumina filler/sealant particles may be alumina impregnated with nano-sized BaO particles, alumina mixed with micron-sized BaO particles, or both alumina impregnated with nano-sized BaO particles and admixed with micron-sized BaO particles. In some embodiments, from 1 wt %-100 wt %, from 20 wt %-wt80%, or from 30 wt %-60 wt % micron-sized BaO may be used in place of non-BaO-impregnated alumina. In some embodiments, a 50:50 mixture of regular MI-386 and BaO impregnated MI-386 (impregnated with nano-sized BaO particles), or a 50:50 mixture of MI-386 and micron-sized BaO particles, or a mixture of MI-386 impregnated with nano-sized BaO particles and admixed with micron-sized BaO particles, may be used for this component of the washcoat. In some embodiments, the alumina can comprise from 5% to 30% nano-BaO-impregnated alumina and from 70% to 95% non-BaO-impregnated alumina. In some embodiments, the alumina can comprise from 5% to 20% nano-BaO-impregnated alumina and from 80% to 95% non-BaO-impregnated alumina. In some embodiments, the alumina can comprise from 8% to 16% nano-BaO-impregnated alumina and from 84% to 92% non-BaO-impregnated alumina. In one embodiment, 12%, or about 12%, nano-BaO-impregnated alumina is mixed with 88%, or about 88%, alumina without impregnated BaO. In one embodiment, 10%, or about 10%, nano-BaO-impregnated alumina is mixed with 90%, or about 90%, alumina without impregnated BaO.

In some embodiments, the alumina can comprise from 5% to 30% micron-sized BaO and from 70% to 95% non-BaO-impregnated alumina. In some embodiments, the alumina can comprise from 5% to 20% micron-sized BaO and from 80% to 95% non-BaO-impregnated alumina. In some embodiments, the alumina can comprise from 8% to 16% micron-sized-BaO and from 84% to 92% non-BaO-impregnated alumina. In one embodiment, 12%, or about 12%, micron-sized BaO is mixed with 88%, or about 88%, alumina without impregnated BaO. In one embodiment, 10%, or about 10%, micron-sized BaO is mixed with 90%, or about 90%, alumina without impregnated BaO.

The ranges for the nano-sized BaO-alumina ratio, that is, the amount of nano-BaO impregnated into the alumina, include 1-20% BaO to 80% to 99% aluminum oxide micron support; 2-15% BaO to 85% to 98% aluminum oxide micron support; 5%-12% BaO to 88% to 95% aluminum oxide micron support; and about 10% BaO to about 90% aluminum oxide micron support, expressed as weight percentages. In one embodiment, the nano-BaO-impregnated aluminum oxide comprises 10%, or about 10%, nano-BaO by weight and 90%, or about 90%, aluminum oxide by weight.

Reducing Washcoat Components

In some embodiments, the reducing washcoat layer in the two layer configurations (configurations 1a, 1b, 3a and 3b in Table 1) comprises, consists essentially of, or consists of reducing nano-on-nano-on-micro (NNm™) particles, boehmite particles, and alumina filler/sealant particles with or without BaO (for example MI-386).

In some embodiments, the reducing NNm™ particles make up between approximately 50% to approximately 95% by weight of the combination of the NNm™ particles, boehmite particles, and alumina filler/sealant particles. In some embodiments, the NNm™ particles make up between approximately 60% to approximately 90% by weight of the combination of the NNm™ particles, boehmite particles, and alumina filler/sealant particles. In some embodiments, the NNm™ particles make up between approximately 75% to approximately 85% by weight of the combination of the NNm™ particles, boehmite particles, and alumina filler/sealant particles. In some embodiments, the NNm™ particles make up about 80% by weight of the combination of the NNm™ particles, boehmite particles, and alumina filler/sealant particles. Preferably, the catalytically active particle in the NNm™ particles is rhodium at a loading of about 0.3 wt % in the NNm™ particles other loadings described previously may also be used.

In some embodiments, the boehmite particles make up between approximately 0.5% to approximately 10% by weight of the combination of the NNm™ particles, boehmite particles, and alumina filler/sealant particles. In some embodiments, the boehmite particles make up between approximately 1% to approximately 7% by weight of the combination of the NNm™ particles, boehmite particles, and alumina filler/sealant particles. In some embodiments, the boehmite particles make up between approximately 2% to approximately 5% by weight of the combination of the NNm™ particles, boehmite particles, and alumina filler/sealant particles. In some embodiments, the boehmite particles make up about 3% by weight of the combination of the NNm™ particles, boehmite particles, and alumina filler/sealant particles.

In some embodiments, the alumina filler/sealant particles make up between approximately 5% to approximately 30% by weight of the combination of the NNm™ particles, boehmite particles, and alumina filler/sealant particles. In some embodiments, the alumina filler/sealant particles make up between approximately 10% to approximately 25% by weight of the combination of the NNm™ particles, boehmite particles, and alumina filler/sealant particles. In some embodiments, the alumina filler/sealant particles make up between approximately 15% to approximately 20% by weight of the combination of the NNm™ particles, boehmite particles, and alumina filler/sealant particles. In some embodiments, the alumina filler/sealant particles make up about 17% by weight of the combination of the NNm™ particles, boehmite particles, and alumina filler/sealant particles. The alumina filler/sealant particles may be porous lanthanum-stabilized alumina, for example MI-386. In some embodiments, a different filler particle may be used in place of some or all of the alumina particles.

In the reducing washcoat from 0 to 100% of the alumina filler/sealant particles may be alumina impregnated with nano-sized BaO particles, alumina mixed with micron-sized BaO particles, or both alumina impregnated with nano-sized BaO particles and admixed with micron-sized BaO particles. In some embodiments, from 1 wt %-100 wt %, from 20 wt %-wt80%, or from 30 wt %-60 wt % micron-sized BaO may be used in place of non-BaO-impregnated alumina. In some embodiments, a 50:50 mixture of regular MI-386 and BaO impregnated MI-386 (impregnated with nano-sized BaO particles), or a 50:50 mixture of MI-386 and micron-sized BaO particles, or a mixture of MI-386 impregnated with nano-sized BaO particles and admixed with micron-sized BaO particles, may be used for this component of the washcoat. In some embodiments, the alumina can comprise from 5% to 30% nano-BaO-impregnated alumina and from 70% to 95% non-BaO-impregnated alumina. In some embodiments, the alumina can comprise from 5% to 20% nano-BaO-impregnated alumina and from 80% to 95% non-BaO-impregnated alumina. In some embodiments, the alumina can comprise from 8% to 16% nano-BaO-impregnated alumina and from 84% to 92% non-BaO-impregnated alumina. In one embodiment, 12%, or about 12%, nano-BaO-impregnated alumina is mixed with 88%, or about 88%, alumina without impregnated BaO. In one embodiment, 10%, or about 10%, nano-BaO-impregnated alumina is mixed with 90%, or about 90%, alumina without impregnated BaO.

In some embodiments, the alumina can comprise from 5% to 30% micron-sized BaO and from 70% to 95% non-BaO-impregnated alumina. In some embodiments, the alumina can comprise from 5% to 20% micron-sized BaO and from 80% to 95% non-BaO-impregnated alumina. In some embodiments, the alumina can comprise from 8% to 16% micron-sized-BaO and from 84% to 92% non-BaO-impregnated alumina. In one embodiment, 12%, or about 12%, micron-sized BaO is mixed with 88%, or about 88%, alumina without impregnated BaO. In one embodiment, 10%, or about 10%, micron-sized BaO is mixed with 90%, or about 90%, alumina without impregnated BaO.

The ranges for the nano-sized BaO-alumina ratio, that is, the amount of nano-BaO impregnated into the alumina, include 1-20% BaO to 80% to 99% aluminum oxide micron support; 2-15% BaO to 85% to 98% aluminum oxide micron support; 5%-12% BaO to 88% to 95% aluminum oxide micron support; and about 10% BaO to about 90% aluminum oxide micron support, expressed as weight percentages. In one embodiment, the nano-BaO-impregnated aluminum oxide comprises 10%, or about 10%, nano-BaO by weight and 90%, or about 90%, aluminum oxide by weight.

One Layer Washcoat Configuration: Combined Washcoat Components

In some embodiments, the combined washcoat layer in the one layer configurations (configurations 2 and 4 in Table 1) comprises, consists essentially of, or consists of oxidizing nano-on-nano-on-micro (NNm™) particles, reducing nano-on-nano-on-micro (NNm™) particles, cerium-zirconium oxide particles, boehmite particles, and alumina filler/sealant particles with or without BaO (for example MI-386).

In some embodiments, the oxidizing NNm™ particles make up between approximately 25% to approximately 75% by weight of the combination of the oxidizing NNm™ particles, reducing NNm™ particles, cerium-zirconium oxide particles, boehmite particles, and alumina filler/sealant particles. In some embodiments, the oxidizing NNm™ particles make up between approximately 35% to approximately 55% by weight of the combination of the oxidizing NNm™ particles, reducing NNm™ particles, cerium-zirconium oxide particles, boehmite particles, and alumina filler/sealant particles. In some embodiments, the oxidizing NNm™ particles make up between approximately 40% to approximately 50% by weight of the combination of the oxidizing NNm™ particles, reducing NNm™ particles, cerium-zirconium oxide particles, boehmite particles, and alumina filler/sealant particles. In some embodiments, the oxidizing NNm™ particles make up about 45% by weight of the combination of the oxidizing NNm™ particles, reducing NNm™ particles, cerium-zirconium oxide particles, boehmite particles, and alumina filler/sealant particles. Preferably, the catalytically active particle in the oxidizing NNm™ particles is palladium at a loading of 1.3-2.0 wt % in the NNm™ particles. Palladium, platinum and platinum and palladium/platinum mixtures may also be used in the loadings described previously.

In some embodiments, the reducing NNm™ particles make up between approximately 5% to approximately 50% by weight of the combination of the oxidizing NNm™ particles, reducing NNm™ particles, cerium-zirconium oxide particles, boehmite particles, and alumina filler/sealant particles. In some embodiments, the reducing NNm™ particles make up between approximately 10% to approximately 40% by weight of the combination of the oxidizing NNm™ particles, reducing NNm™ particles, cerium-zirconium oxide particles, boehmite particles, and alumina filler/sealant particles. In some embodiments, the reducing NNm™ particles make up between approximately 20% to approximately 30% by weight of the combination of the oxidizing NNm™ particles, reducing NNm™ particles, cerium-zirconium oxide particles, boehmite particles, and alumina filler/sealant particles. In some embodiments, the reducing NNm™ particles make up about 25% by weight of the combination of the oxidizing NNm™ particles, reducing NNm™ particles, cerium-zirconium oxide particles, boehmite particles, and alumina filler/sealant particles. Preferably, the catalytically active particle in the reducing NNm™ particles is rhodium at a loading of 0.3-wt % in the reducing NNm™ particles. Preferably, the catalytically active particle in the reducing NNm™ particles is rhodium at a loading of about 0.3 wt % in the reducing NNm™ particles. Other loadings described previously may also be used.

The micron-sized porous cerium-zirconium oxide particles described with respect to the reducing NNm™ support particles may be used for the micron-sized porous cerium-zirconium oxide component in the combined washcoat formulation. In some embodiments, the micron-sized porous cerium-zirconium oxide particles make up between approximately 1% to approximately 40% by weight of the combination of the oxidizing NNm™ particles, reducing NNm™ particles, cerium-zirconium oxide particles, boehmite particles, and alumina filler/sealant particles. In some embodiments, the micron-sized porous cerium-zirconium oxide particles make up between approximately 5% to approximately 30% by weight of the combination of the oxidizing NNm™ particles, reducing NNm™ particles, cerium-zirconium oxide particles, boehmite particles, and alumina filler/sealant particles. In some embodiments, the micron-sized porous cerium-zirconium oxide particles make up between approximately 10% to approximately 20% by weight of the combination of the oxidizing NNm™ particles, reducing NNm™ particles, cerium-zirconium oxide particles, boehmite particles, and alumina filler/sealant particles. In some embodiments, the micron-sized porous cerium-zirconium oxide particles make up about 15% by weight of the combination of the oxidizing NNm™ particles, reducing NNm™ particles, cerium-zirconium oxide particles, boehmite particles, and alumina filler/sealant particles.

In some embodiments, the boehmite particles make up between approximately 0.5% to approximately 10% by weight of the combination of the oxidizing NNm™ particles, reducing NNm™ particles, cerium-zirconium oxide particles, boehmite particles, and alumina filler/sealant particles. In some embodiments, the boehmite particles make up between approximately 1% to approximately 7% by weight of the combination of the oxidizing NNm™ particles, reducing NNm™ particles, cerium-zirconium oxide particles, boehmite particles, and alumina filler/sealant particles. In some embodiments, the boehmite particles make up between approximately 2% to approximately 5% by weight of the combination of the oxidizing NNm™ particles, reducing NNm™ particles, cerium-zirconium oxide particles, boehmite particles, and alumina filler/sealant particles. In some embodiments, the boehmite particles make up about 3% by weight of the combination of the oxidizing NNm™ particles, reducing NNm™ particles, cerium-zirconium oxide particles, boehmite particles, and alumina filler/sealant particles.

In some embodiments, the alumina filler/sealant particles make up between approximately 1% to approximately 25% by weight of the combination of the oxidizing NNm™ particles, reducing NNm™ particles, cerium-zirconium oxide particles, boehmite particles, and alumina filler/sealant particles. In some embodiments, the alumina filler/sealant particles make up between approximately 5% to approximately 20% by weight of the combination of the oxidizing NNm™ particles, reducing NNm™ particles, cerium-zirconium oxide particles, boehmite particles, and alumina filler/sealant particles. In some embodiments, the alumina filler/sealant particles make up between approximately 10% to approximately 15% by weight of the combination of the oxidizing NNm™ particles, reducing NNm™ particles, cerium-zirconium oxide particles, boehmite particles, and alumina filler/sealant particles. In some embodiments, the alumina filler/sealant particles make up about 12% by weight of the combination of the oxidizing NNm™ particles, reducing NNm™ particles, cerium-zirconium oxide particles, boehmite particles, and alumina filler/sealant particles. The alumina filler/sealant particles may be porous lanthanum-stabilized alumina, for example MI-386. In some embodiments, a different filler particle may be used in place of some or all of the alumina particles.

In the combination washcoat from 0 to 100% of the alumina filler/sealant particles may be alumina impregnated with nano-sized BaO particles, alumina mixed with micron-sized BaO particles, or both alumina impregnated with nano-sized BaO particles and admixed with micron-sized BaO particles. In some embodiments, from 1 wt %-100 wt %, from 20 wt %-wt80%, or from 30 wt %-60 wt % micron-sized BaO may be used in place of non-BaO-impregnated alumina. In some embodiments, a 50:50 mixture of regular MI-386 and BaO impregnated MI-386 (impregnated with nano-sized BaO particles), or a 50:50 mixture of MI-386 and micron-sized BaO particles, or a mixture of MI-386 impregnated with nano-sized BaO particles and admixed with micron-sized BaO particles, may be used for this component of the washcoat. In some embodiments, the alumina can comprise from 5% to 30% nano-BaO-impregnated alumina and from 70% to 95% non-BaO-impregnated alumina. In some embodiments, the alumina can comprise from 5% to 20% nano-BaO-impregnated alumina and from 80% to 95% non-BaO-impregnated alumina. In some embodiments, the alumina can comprise from 8% to 16% nano-BaO-impregnated alumina and from 84% to 92% non-BaO-impregnated alumina. In one embodiment, 12%, or about 12%, nano-BaO-impregnated alumina is mixed with 88%, or about 88%, alumina without impregnated BaO. In one embodiment, 10%, or about 10%, nano-BaO-impregnated alumina is mixed with 90%, or about 90%, alumina without impregnated BaO.

In some embodiments, the alumina can comprise from 5% to 30% micron-sized BaO and from 70% to 95% non-BaO-impregnated alumina. In some embodiments, the alumina can comprise from 5% to 20% micron-sized BaO and from 80% to 95% non-BaO-impregnated alumina. In some embodiments, the alumina can comprise from 8% to 16% micron-sized-BaO and from 84% to 92% non-BaO-impregnated alumina. In one embodiment, 12%, or about 12%, micron-sized BaO is mixed with 88%, or about 88%, alumina without impregnated BaO. In one embodiment, 10%, or about 10%, micron-sized BaO is mixed with 90%, or about 90%, alumina without impregnated BaO.

The ranges for the nano-sized BaO-alumina ratio, that is, the amount of nano-BaO impregnated into the alumina, include 1-20% BaO to 80% to 99% aluminum oxide micron support; 2-15% BaO to 85% to 98% aluminum oxide micron support; 5%-12% BaO to 88% to 95% aluminum oxide micron support; and about 10% BaO to about 90% aluminum oxide micron support, expressed as weight percentages. In one embodiment, the nano-BaO-impregnated aluminum oxide comprises 10%, or about 10%, nano-BaO by weight and 90%, or about 90%, aluminum oxide by weight.

In some embodiments, the catalyst-containing washcoat composition is mixed with water and acid, such as acetic acid, prior to the coating of the substrate with the catalyst-containing washcoat composition, thereby forming an aqueous mixture of the catalyst-containing washcoat composition, water, and acid. This aqueous mixture of the catalyst-containing washcoat composition, water, and acid is then applied to the substrate (where the substrate may or may not already have other washcoat layers applied to it). In some embodiments, the pH of this aqueous mixture is adjusted to a pH level of about 2 to about 7 prior to it being applied to the substrate. In some embodiments, the pH of this aqueous mixture is adjusted to a pH level of about 4 prior to it being applied to the substrate. In some embodiments, the viscosity of the aqueous washcoat is adjusted by mixing with a cellulose solution, with corn starch, or with similar thickeners. In some embodiments, the viscosity is adjusted to a value between about 300 cP to about 1200 cP.

In some embodiments, the oxidizing catalyst, palladium or platinum, containing washcoat composition comprises a thickness of approximately 50 g/l to approximately 300 g/l, such as approximately 150 g/l to approximately 250 g/l, approximately 175 g/l to approximately 225 g/l, or approximately 185 g/l to approximately 210 g/l, or about 200 g/l palladium or platinum.

In some embodiments, the reducing catalyst, rhodium containing washcoat composition comprises a thickness of 10 g/l to approximately 150 g/l, such as approximately 50 g/l to approximately 120 g/l, approximately 60 g/l to approximately 100 g/l, or approximately 70 g/l to approximately 90 g/l, or about 80 g/l rhodium.

Procedure for Preparation of Washcoat:Containing Catalysts for Oxidation Reaction The oxidative nano-on-nano-on micro catalytically active material (for example nano-Pd or nano-Pt-on-nano-on-micro) can be mixed with La stabilized micron-sized $Al_2O_3$, boehmite, and water to form a washcoat slurry. In some instances, the mixture contains about 55% by weight of the catalytic active material (nano-on-nano and nano-sized $Al_2O_3$ without precious metal), about 27% by weight of the micron-sized $Al_2O_3$, about 3% by weight boehmite, and 15% micron CZ. In some instances, the washcoat is adjusted to have a pH of 4 or approximately 4.

Procedure for Preparation of Washcoat Containing Catalysts for Reduction Reaction The reductive nano-on-nano-on micro catalytically active material (for example Rh) can be mixed with micron-sized cerium zirconium oxide, boehmite, and water to form a washcoat slurry. In some instances, the mixture comprises 80% by weight of the catalytic active material (for example nano-rhodium on nano CZ on micro-CZ), 3% by weight of boehmite, and 17% MI 386 $Al_2O_3$. In some instances, the washcoat is adjusted to have a pH of 4 or approximately 4.

Coated Substrate with Separate Layers of Oxidative Nanoparticles and Reductive Nanoparticles The oxidative and reductive nanoparticles may be in the same or different layers. Preferably, the ratio of oxidative nanoparticles to reductive nanoparticles is between 2:1 and 100:1, is between 3:1 and 70:1, or is between 6:1 and 40:1.

Oxidation and Reduction Catalysts in Different Layers

A coated substrate may include a first layer washcoat containing oxidative catalytically active nanoparticles and a second layer washcoat containing reductive catalytically active nanoparticles. In certain embodiments, the oxidative catalytically active nanoparticles do not react with the reductive catalytically active nanoparticles.

The washcoat containing catalysts for oxidation and the washcoat containing catalysts for reduction can be applied to a monolith of a grid array structure, for example a honeycomb structure. In some instances, the washcoats can form a layered structure in the channels of the monolith. In some instances, the washcoat that contains catalysts for oxidation reactions can be applied first. In some instances, the washcoat that contains catalysts for reduction reaction can be applied first. The application of the washcoat onto the monolith can be achieved, for example, by dipping the monolith into a washcoat slurry. After the slurry is dried, the monolith can be baked in an oven at 550° C. for one hour. Next, the monolith can be dipped into the second washcoat slurry. After the slurry of the second dip is dried, the monolith can be baked in the oven again at 550° C. for one hour.

A person having ordinary skill in the art would be able to use typical methods or procedures to apply the washcoat prepared according to the procedures described above to make a catalytic converter, which can be used in various fields, such as for a catalytic converter for diesel engines and/or other motor vehicles.

Oxidation and Reduction Catalysts in the Same Layer

The following are experimental procedures for making a coated substrate containing a oxidative catalytically active particles and reductive catalytically active particles in the same washcoat layer. The oxidative and reductive catalytic active material is mixed with micron-sized cerium zirconium oxide, micron-sized aluminum oxide, boehmite, and water to form a washcoat slurry. In some embodiments, the washcoat is adjusted to have a pH of about 4.

The washcoat contains catalysts for both oxidation and reduction reactions can be applied to a monolith of a grid array structure in a single set of procedure. The application of the washcoat onto the monolith can be achieved by dipping the monolith into a washcoat slurry. After the slurry is dried, the monolith is baked in an oven at 550° C. for one hour.

A person who has ordinary skill in the art would be able to use typical methods or procedures to apply the washcoat prepared according to the procedures described above to make a catalytic converter, which can be used in various field, such as the catalytic converter for diesel engines and/or other motor vehicles.

FIG. 1 shows a graphic illustration of a catalytic converter 100 in accordance with embodiments of the present disclosure. The catalytic converter 100 can be installed in a motor vehicle 102. The motor vehicle 102 includes an engine 104. The engine can combust fossil fuel, diesel, or gasoline and generate energy and waste gas. The waste gas or exhausts are treated by the catalytic converter 100. The catalytic converter 100 can contain a grid array structure 106. The grid array structure can be coated with a first layer of washcoat 108 and a second layer of washcoat 150. The positions of the first layer 108 and the second layer 150 of the washcoat may be interchangeable, so that the first layer can be on top of the second layer in some embodiments and the second layer can be on top of the first layer in alternative embodiments. In certain embodiments, the second layer covers at least a portion of the substrate, and the first layer covers at least a portion of the second layer. In certain embodiments, the first layer covers at least a portion of the substrate, and the second layer covers at least a portion of the first layer.

The washcoats 108, 150 can contain different chemical compositions. The compositions contained in the washcoat 108 can be reactive to gases that exist in the exhausts different from the gases to which the composition of washcoat 150 is reactive. In some embodiments, washcoat 108 contains active catalytic materials 120, cerium zirconium oxide 122, Boehmite 126, and/or other materials. The active catalytic materials 120 can contain a micron-sized support 110. The nanoparticles can be immobilized onto the micron-sized support 110 to prevent the clustering or sintering of the nanomaterials. The nanomaterials can include an oxidative catalyst, such as Pd nanoparticles 116, precious metal support in nano-sized 118, such as nano-sized aluminum oxide, and nano-sized aluminum oxide 114 without any active catalytic materials coupled to it. As shown in FIG. 1, the active catalytic material 120 can include precious metal nanoparticles 116 on nano-sized $Al_2O_3$ 118 (e.g., nano-on-nano or n-on-n material 130). The nano-on-nano material 130 is randomly distributed on the surface of micron-sized $Al_2O_3$ 112.

In some embodiments, washcoat 150 contains active catalytic materials 152, micron-sized aluminum oxide 154, boehmite 156, and/or other materials. The active catalytic materials 152 can contain a micron-sized support 160. The nanomaterials can be immobilized on the micron-sized support 160 to prevent the clustering or sintering of the nanomaterials. The nanomaterials can include a reductive catalyst, such as nano-sized Rh nanoparticles 162, nano-sized precious metal support 164, such as nano-sized cerium zirconium oxide, and nano-sized cerium zirconium oxide 166 that does contain any active catalytic materials.

Figure 2:
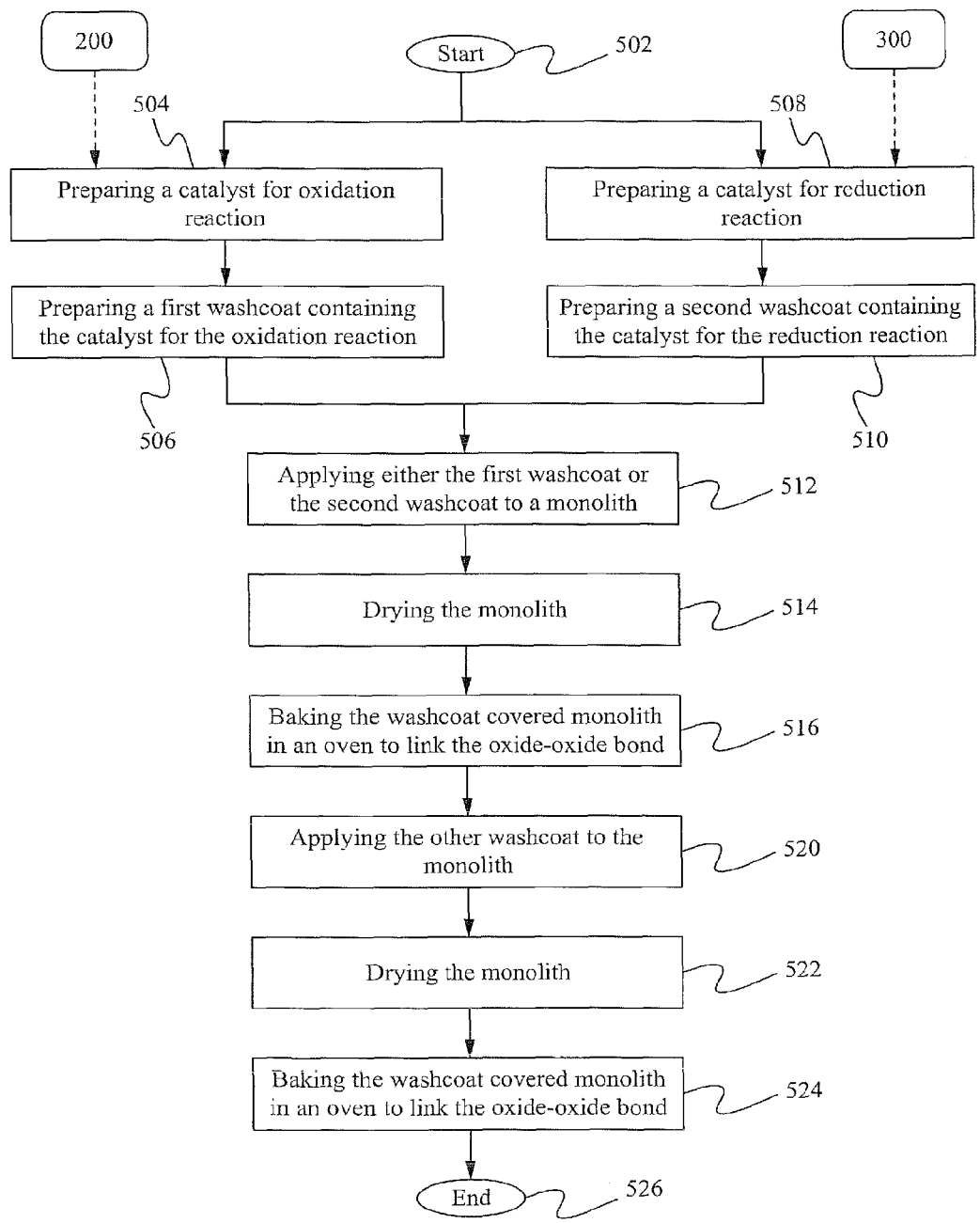
FIG. 2 is a flow chart illustrating a preparation method of a coated substrate comprising oxidative catalytically active particles and reductive catalytically active particles contained in separate washcoat layers in accordance with the present disclosure.

FIG. 2 is a flow chart illustrating a three-way catalyst system preparation method 500 in accordance with embodiments of the present disclosure. The three-way catalyst system includes both oxidative catalytically active particles and reductive catalytically active particles in separate washcoat layers on a substrate.

The three-way catalyst system preparation method 500 can start from Step 502. At Step 504, a catalyst for oxidation reaction is prepared. At Step 506, a first washcoat containing the catalyst for oxidation reaction is prepared. At Step 508, a catalyst for reduction reaction is prepared. At Step 510, a second washcoat containing the catalyst for reduction reaction is prepared. At Step 512, either the first washcoat or the second washcoat is applied to a substrate. At Step 514, the substrate is dried. At Step 516, the washcoat-covered substrate is baked in an oven allowing the formation of the oxide-oxide bonds, resulting in immobilized nanoparticles. At Step 520, the other washcoat is applied on the substrate. At Step 522, the substrate is dried. At Step 524, the washcoat-covered substrate oxidative catalytically active particles and reductive catalytically active particles contained in separate layers is baked in an oven allowing the formation of the oxide-oxide bonds. The method 500 ends at Step 526. The oxide-oxide bonds formed during the baking process firmly retain the nanoparticles, so that the chances for the oxidative nanoparticles and/or the reductive nanoparticles to move at high temperature and to encounter and react with each other are avoided.

Coated Substrate with Oxidative Nanoparticles and Reductive Nanoparticles in the Same Layer In certain embodiments, the coated substrate includes a washcoat layer that contains both oxidative catalytically active particles and reductive catalytically active particles. In certain embodiments, the oxidative catalytically active nanoparticles do not react or couple with the reductive catalytically active nanoparticles, though being in the same layer.

Figure 3:
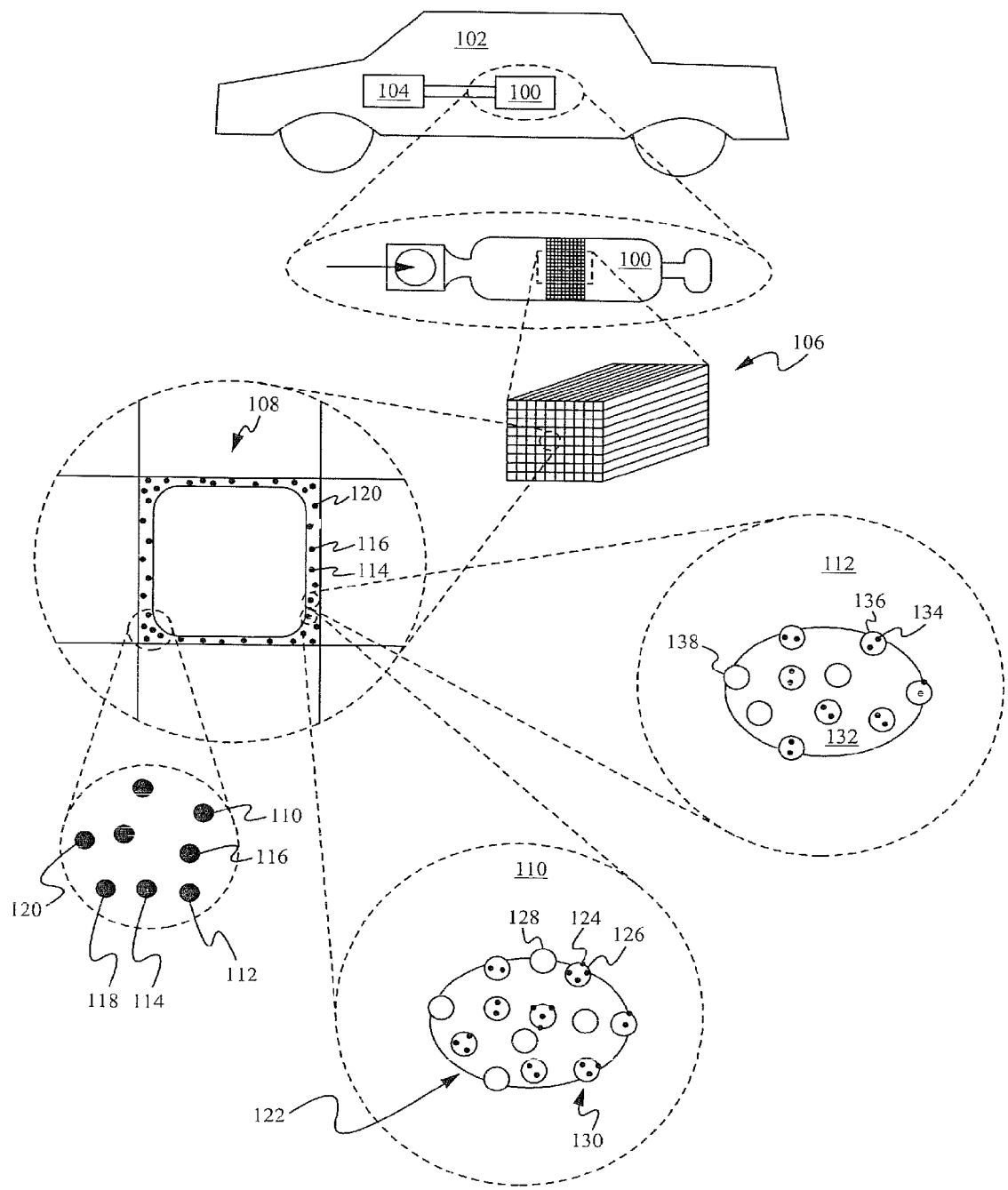
FIG. 3 shows a graphic illustration of a catalytic converter with a coated substrate comprising oxidative catalytically active particles and reductive catalytically active particles contained in the same washcoat layer in accordance with the present disclosure.

FIG. 3 shows a graphic illustration of the catalytic converter 100 in accordance with some embodiments. The catalytic converter 100 can be installed in a motor vehicle 102. The motor vehicle 102 includes an engine 104. The engine can combust fossil fuel, diesel, or gasoline and generate energy and exhaust gas. The waste gas or exhausts are treated by the catalytic converter 100. The catalytic converter 100 can comprise a grid array structure 106. The grid array structure can be coated with a layer of washcoat 108 that contains both oxidative catalytically active particles and reductive catalytically active particles.

The washcoat 108 can contain different chemical compositions. The different compositions contained in the washcoat 108 can be reactive to different gases that exist in the exhausts. In some embodiments, the washcoat 108 contains oxidative compositions 110 and reductive compositions 112. In some embodiments, the washcoat 108 also contains Boehmite 114, micron-sized cerium zirconium oxide 116, and micron-sized aluminum oxide 120.

The active catalytic materials 110 can contain a micron-sized support 122, such as micron-sized aluminum oxide. The nanomaterials can be immobilized onto the micron-sized support 122 to prevent the clustering or sintering of the nanomaterials. The nanomaterials can include precious metals, such as Pd nanoparticles 124, precious metal support in nano-sized 126, such as nano-sized aluminum oxide, and nano-sized aluminum oxide 128 that does not contain any active catalytic materials. As shown in FIG. 3, the precious metal nanoparticles 124 on the nano-sized $Al_2O_3$ 126 (nano-on-nano material 130) can be mixed with nano-sized $Al_2O_3$ 128 to be randomly distributed on the surface of the micron-sized $Al_2O_3$ 122 forming the active catalytic material 110. The nano-sized $Al_2O_3$ 128 can be aluminum oxide nanoparticle having no active catalytic material on the surface.

The active catalytic materials 112 can contain a micron-sized support 132, such as micron-sized cerium zirconium oxide. The nanomaterials can be immobilized on the micron-sized support 132 to prevent the clustering or sintering of the nanomaterials. The nanomaterials can include precious metals that have ability to be a reductive catalyst, such as Rh nanoparticles 134, precious metal support in nano-sized 136, such as nano-sized cerium zirconium oxide, and nano-sized cerium zirconium oxide 138 that does not contain active catalytic materials on the surface. As shown in FIG. 3, the precious metal nanoparticles 134 on the nano-sized cerium zirconium oxide 136 (nano-on-nano material) can be mixed with nano-sized cerium zirconium oxide 138 to be randomly distributed on the surface of the micron-sized cerium zirconium oxide 132, forming the active catalytic material 112.

Figure 4:
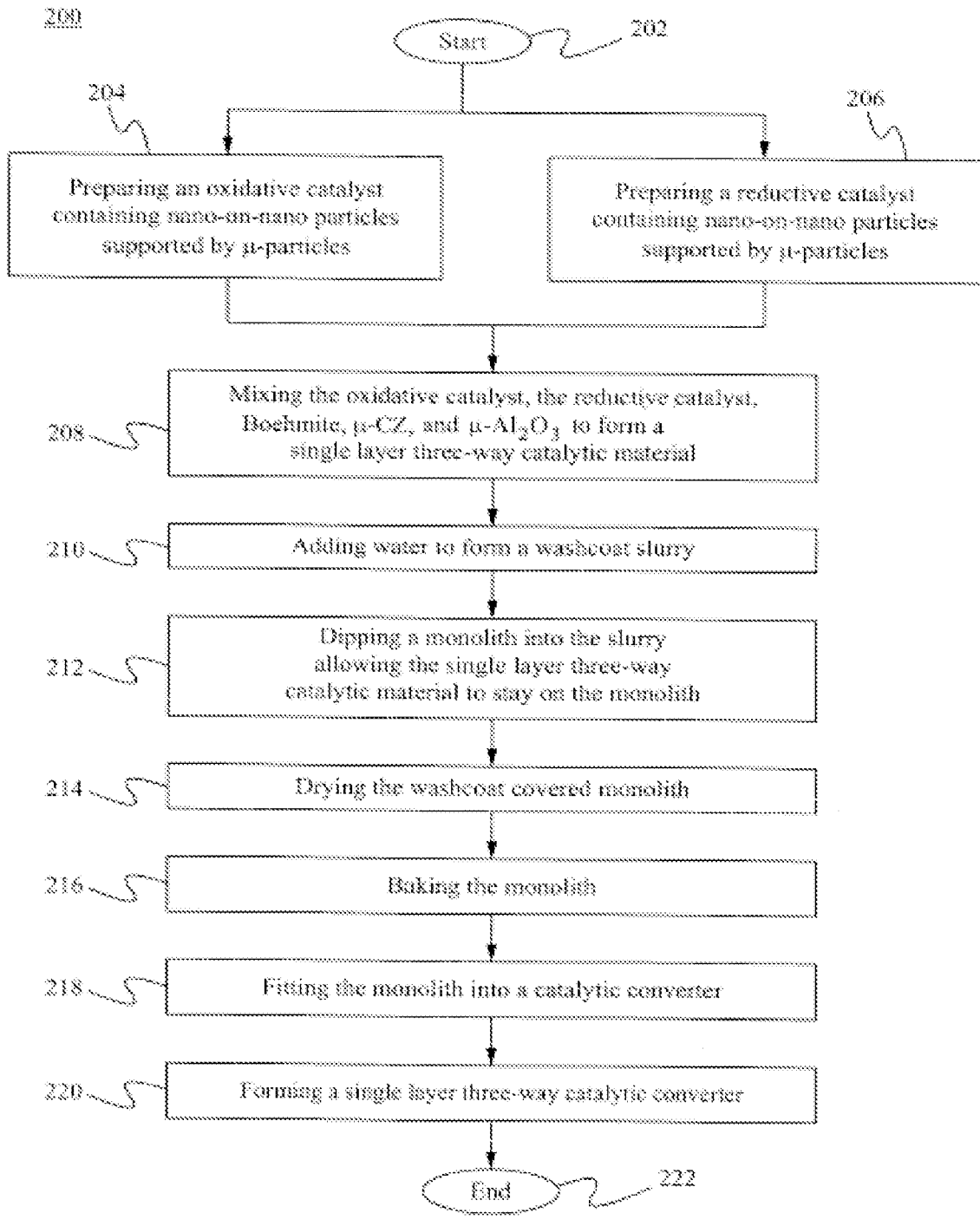
FIG. 4 is a flow chart illustrating a preparation method of a coated substrate comprising oxidative catalytically active particles and reductive catalytically active particles contained in the same washcoat layer in accordance with the present disclosure.

FIG. 4 is a flow chart illustrating a three-way catalytic system preparation method 200 in accordance with some embodiments. Compared to traditional methods, in method 200, a three-way catalytic system with oxidative catalytically active particles and reductive catalytically active particles contained in the same layer is prepared by using a "one-dip" process. The one dip process can be used to apply a mixture containing both oxidative catalytically active particles and reductive catalytically active particles onto a substrate by performing a dipping procedure once.

The three-way catalytic system preparation method 200 can start at Step 202. At Step 204, an oxidative catalytically active particle is prepared. At Step 206, a reductive catalytically active particle is prepared is prepared. At Step 208, the oxidative catalytically active particles and the reductive catalytically active particles are mixed to form a three-way catalytic material. At Step 210, water is added to the catalytic material form a washcoat slurry. At Step 212, a substrate is dipped into the slurry, allowing the three-way catalytic material to stay on the substrate. A person who has ordinary skill in the art would appreciate that any methods are able to be used to apply the washcoat slurry onto the substrate. For example, the washcoat is able to be sprayed to make it stay on the substrate. At Step 214, the washcoat-covered substrate is dried. At Step 216, the substrate is baked in an oven. At Step 218, the substrate is fitted into a catalytic converter. At Step 220, a three-way catalytic converter with oxidative catalytically active particles and reductive catalytically active particles contained in the same layer is formed. The method 200 can end at Step 222. The oxide-oxide bonds formed during the baking process firmly retain the nanoparticles, so that the chances for the oxidative nanoparticles and/or the reductive nanoparticles to move at high temperature and to encounter and react with each other are avoided.

Exhaust Systems, Vehicles, and Emissions Performance

Three-way conversion (TWC) catalysts have utility in a number of fields including the treatment of exhaust gas streams from internal combustion engines, such as automobile, truck and other gasoline-fueled engines. Emission standards for unburned hydrocarbons, carbon monoxide and nitrogen oxide contaminants have been set by various governments and must be met by older as well as new vehicles. In order to meet such standards, catalytic converters containing a TWC catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

In some embodiments, a coated substrate as disclosed herein is housed within a catalytic converter in a position configured to receive exhaust gas from an internal combustion engine, such as in an exhaust system of an internal combustion engine. The catalytic converter can be used with the exhaust from a gasoline engine. The catalytic converter can be installed on a vehicle containing a gasoline engine.

The coated substrate is placed into a housing, such as that shown in FIGS. 1 and 3, which can in turn be placed into an exhaust system (also referred to as an exhaust treatment system) of a gasoline internal combustion. The exhaust system of the internal combustion engine receives exhaust gases from the engine, typically into an exhaust manifold, and delivers the exhaust gases to an exhaust treatment system. The exhaust system can also include other components, such as oxygen sensors, HEGO (heated exhaust gas oxygen) sensors, UEGO (universal exhaust gas oxygen) sensors, sensors for other gases, and temperature sensors. The exhaust system can also include a controller such as an engine control unit (ECU), a microprocessor, or an engine management computer, which can adjust various parameters in the vehicle (fuel flow rate, fuel/air ratio, fuel injection, engine timing, valve timing, etc.) in order to optimize the components of the exhaust gases that reach the exhaust treatment system, so as to manage the emissions released into the environment.

"Treating" an exhaust gas, such as the exhaust gas from a gasoline engine refers to having the exhaust gas proceed through an exhaust system (exhaust treatment system) prior to release into the environment.

When used in a catalytic converter, the substrates coated with the washcoat formulations including nano-on-nano-on-micro particles disclosed herein provide a significant improvement over other catalytic converters. The coated substrates may exhibit performance in converting hydrocarbons, carbon monoxide, and nitrogen oxides that is comparable or better than present commercial coated substrates using wet chemistry techniques with the same or less loading of PGM.

In some embodiments, catalytic converters and exhaust treatment systems employing the coated substrates disclosed herein display emissions of 3400 mg/mile or less of CO emissions and 400 mg/mile or less of $NO_x$ emissions; 3400 mg/mile or less of CO emissions and 200 mg/mile or less of $NO_x$ emissions; or 1700 mg/mile or less of CO emissions and 200 mg/mile or less of $NO_x$ emissions. The disclosed coated substrates, used as catalytic converter substrates, can be used in an emission system to meet or exceed these standards.

Emissions limits for Europe are summarized at the URL europa.eu/legislation_summaries/environment/air_pollution/l28186_en.htm. The Euro 5 emissions standards, in force as of September 2009, specify a limit of 500 mg/km of CO emissions, 180 mg/km of $NO_x$ emissions, and 230 mg/km of HC (hydrocarbon)+$NO_x$ emissions. The Euro 6 emissions standards, scheduled for implementation as of September 2014, specify a limit of 500 mg/km of CO emissions, 80 mg/km of $NO_x$ emissions, and 170 mg/km of HC (hydrocarbon)+$NO_x$ emissions. The disclosed catalytic converter substrates can be used in an emission system to meet or exceed these standards.

In some embodiments, a catalytic converter made with a coated substrate of the invention, loaded with 4.0 g/l of PGM or less displays a carbon monoxide light-off temperature at least 5 degrees C. lower than a catalytic converter made with wet chemistry methods and having the same or similar PGM loading. In some embodiments, a catalytic converter made with a coated substrate of the invention, loaded with 4.0 g/l of PGM or less, displays a carbon monoxide light-off temperature at least 10 degrees C. lower than a catalytic converter made with wet chemistry methods and having the same or similar PGM loading. In some embodiments, a catalytic converter made with a coated substrate of the invention, loaded with 4.0 g/l of PGM or less, displays a carbon monoxide light-off temperature at least 15 degrees C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 4.0 g/l of PGM or less, displays a hydrocarbon light-off temperature at least 5 degrees C. lower than a catalytic converter made with wet chemistry methods and having the same or similar PGM loading. In some embodiments, a catalytic converter made with a coated substrate of the invention, loaded with 4.0 g/l of PGM or less, displays a hydrocarbon light-off temperature at least 10 degrees C. lower than a catalytic converter made with wet chemistry methods and having the same or similar PGM loading. In some embodiments, a catalytic converter made with a coated substrate of the invention, loaded with 4.0 g/l of PGM or less, displays a hydrocarbon light-off temperature at least 15 degrees C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 4.0 g/l of PGM or less, displays a nitrogen oxide light-off temperature at least 5 degrees C. lower than a catalytic converter made with wet chemistry methods and having the same or similar PGM loading. In some embodiments, a catalytic converter made with a coated substrate of the invention, loaded with 4.0 g/l of PGM or less, displays a nitrogen oxide light-off temperature at least 10 degrees C. lower than a catalytic converter made with wet chemistry methods and having the same or similar PGM loading. In some embodiments, a catalytic converter made with a coated substrate of the invention, loaded with 4.0 g/l of PGM or less, displays a nitrogen oxide light-off temperature at least 15 degrees C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 3.0 g/l of PGM or less, displays a carbon monoxide light-off temperature at least 5 degrees C. lower than a catalytic converter made with wet chemistry methods and having the same or similar PGM loading. In some embodiments, a catalytic converter made with a coated substrate of the invention, loaded with 3.0 g/l of PGM or less, displays a carbon monoxide light-off temperature at least 10 degrees C. lower than a catalytic converter made with wet chemistry methods and having the same or similar PGM loading. In some embodiments, a catalytic converter made with a coated substrate of the invention, loaded with 3.0 g/l of PGM or less, displays a carbon monoxide light-off temperature at least 15 degrees C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 3.0 g/l of PGM or less, displays a hydrocarbon light-off temperature at least 5 degrees C. lower than a catalytic converter made with wet chemistry methods and having the same or similar PGM loading. In some embodiments, a catalytic converter made with a coated substrate of the invention, loaded with 3.0 g/l of PGM or less, displays a hydrocarbon light-off temperature at least 10 degrees C. lower than a catalytic converter made with wet chemistry methods and having the same or similar PGM loading. In some embodiments, a catalytic converter made with a coated substrate of the invention, loaded with 3.0 g/l of PGM or less, displays a hydrocarbon light-off temperature at least 15 degrees C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 3.0 g/l of PGM or less, displays a nitrogen oxide light-off temperature at least 5 degrees C lower than a catalytic converter made with wet chemistry methods and having the same or similar PGM loading. In some embodiments, a catalytic converter made with a coated substrate of the invention, loaded with 3.0 g/l of PGM or less, displays a nitrogen oxide light-off temperature at least 10 degrees C. lower than a catalytic converter made with wet chemistry methods and having the same or similar PGM loading. In some embodiments, a catalytic converter made with a coated substrate of the invention, loaded with 3.0 g/l of PGM or less, displays a nitrogen oxide light-off temperature at least 15 degrees C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−2 degrees C. of the carbon monoxide light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−1 degrees C. of the carbon monoxide light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−2 degrees C. of the hydrocarbon light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−1 degrees C. of the hydrocarbon light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 kin, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−2 degrees C. of the nitrogen oxide light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within +/−4 degrees C. of the nitrogen oxide light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a gasoline engine or gasoline vehicle complies with United States EPA emissions requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with the same standard. In some embodiments, the coated substrate is used in a catalytic converter to meet or exceed these standards. The emissions requirements can be intermediate life requirements or full life requirements. The requirements can be TLEV requirements, LEV requirements, or ULEV requirements. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a gasoline engine or gasoline vehicle complies with EPA TLEV/LEV intermediate life requirements. In some embodiments, a catalytic converter made with a coated substrate of the invention employed on a gasoline engine or gasoline vehicle complies with EPA TLEV/LEV full life requirements. In some embodiments, a catalytic converter made with a coated substrate of the invention employed on a gasoline engine or gasoline vehicle complies with EPA ULEV intermediate life requirements. In some embodiments, a catalytic converter made with a coated substrate of the invention employed on a gasoline engine or gasoline vehicle complies with EPA ULEV full life requirements. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention employed on a gasoline engine or gasoline vehicle complies with EPA TLEV/LEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a gasoline engine or gasoline vehicle complies with EPA TLEV/LEV full life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a gasoline engine or gasoline vehicle complies with EPA ULEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a gasoline engine or gasoline vehicle complies with EPA ULEV full life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a gasoline engine or gasoline vehicle complies with EPA SULEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a gasoline engine or gasoline vehicle complies with EPA SULEV full life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter). In some embodiments, the requirements above are those for light duty vehicles. In some embodiments, the requirements above are those for light duty trucks. In some embodiments, the requirements above are those for medium duty vehicles.

In some embodiments, a catalytic converter made with a coated substrate of the invention employed on a gasoline engine or gasoline vehicle complies with Euro 5 requirements. In some embodiments, a catalytic converter made with a coated substrate of the invention employed on a gasoline engine or gasoline vehicle complies with Euro 6 requirements. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention employed on a gasoline engine or gasoline vehicle complies with Euro 5 requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with Euro 5 requirements. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a gasoline engine or gasoline vehicle complies with Euro 6 requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with Euro 6 requirements. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a gasoline engine or gasoline vehicle displays carbon monoxide emissions of 4200 mg/mile or less. In some embodiments, a catalytic converter made with a coated substrate of the invention and employed on a gasoline engine or gasoline vehicle displays carbon monoxide emissions of 3400 mg/mile or less. In some embodiments, a catalytic converter made with a coated substrate of the invention and employed on a gasoline engine or gasoline vehicle displays carbon monoxide emissions of 2100 mg/mile or less. In another embodiment, a catalytic converter made with a coated substrate of the invention and employed on a gasoline engine or gasoline vehicle displays carbon monoxide emissions of 1700 mg/mile or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a gasoline engine or gasoline vehicle displays carbon monoxide emissions of 500 mg/km or less. In some embodiments, a catalytic converter made with a coated substrate of the invention and employed on a gasoline engine or gasoline vehicle displays carbon monoxide emissions of 375 mg/km or less. In some embodiments, a catalytic converter made with a coated substrate of the invention and employed on a gasoline engine or gasoline vehicle displays carbon monoxide emissions of 250 mg/km or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a gasoline engine or gasoline vehicle displays $NO_x$ emissions of 180 mg/km or less. In some embodiments, a catalytic converter made with a coated substrate of the invention and employed on a gasoline engine or gasoline vehicle displays $NO_x$ emissions of 80 mg/km or less. In some embodiments, a catalytic converter made with a coated substrate of the invention and employed on a gasoline engine or gasoline vehicle displays NO emissions of 40 mg/km or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a gasoline engine or gasoline vehicle displays $NO_x$ plus HC emissions of 230 mg/km or less. In some embodiments, a catalytic converter made with a coated substrate of the invention and employed on a gasoline engine or gasoline vehicle displays NO plus HC emissions of 170 mg/km or less. In some embodiments, a catalytic converter made with a coated substrate of the invention and employed on a gasoline engine or gasoline vehicle displays $NO_x$ plus HC emissions of 85 mg/km or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate and employed on a gasoline engine or gasoline vehicle displays carbon monoxide emissions of 500 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays carbon monoxide emissions of 375 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays carbon monoxide emissions of 250 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention and employed on a gasoline engine or gasoline vehicle displays $NO_x$ emissions of 180 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays $NO_x$ emissions of 80 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays $NO_x$ emissions of 40 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention and employed on a gasoline engine or gasoline vehicle displays $NO_x$ plus HC emissions of 230 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays $NO_x$ plus HC emissions of 170 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays $NO_x$ plus HC emissions of 85 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, for the above-described comparisons, the thrifting (reduction) of platinum group metal for the catalytic converters made with substrates of the invention is compared with either 1) a commercially available catalytic converter, made using wet chemistry, for the application disclosed (e.g., for use on a gasoline engine or gasoline vehicle), or 2) a catalytic converter made with wet chemistry, which uses the minimal amount of platinum group metal to achieve the performance standard indicated.

In some embodiments, for the above-described comparisons, both the coated substrate according to the invention, and the catalyst used in the commercially available catalytic converter or the catalyst prepared using wet chemistry methods, are aged (by the same amount) prior to testing. In some embodiments, both the coated substrate according to the invention, and the catalyst substrate used in the commercially available catalytic converter or the catalyst substrate prepared using wet chemistry methods, are aged to about (or up to about) 50,000 kilometers, about (or up to about) 50,000 miles, about (or up to about) 75,000 kilometers, about (or up to about) 75,000 miles, about (or up to about) 100,000 kilometers, about (or up to about) 100,000 miles, about (or up to about) 125,000 kilometers, about (or up to about) 125,000 miles, about (or up to about) 150,000 kilometers, or about (or up to about) 150,000 miles. In some embodiments, for the above-described comparisons, both the coated substrate according to the invention, and the catalyst substrate used in the commercially available catalytic converter or the catalyst substrate prepared using wet chemistry methods, are artificially aged (by the same amount) prior to testing. In some embodiments, they are artificially aged by heating to about 400° C., about 500° C., about 600° C., about 700° C., about 800° C., about 900° C., about 1000° C., about 1100° C., or about 1200° C. for about (or up to about) 4 hours, about (or up to about) 6 hours, about (or up to about) 8 hours, about (or up to about) 10 hours, about (or up to about) 12 hours, about (or up to about) 14 hours, about (or up to about) 16 hours, about (or up to about) 18 hours, about (or up to about) 20 hours, about (or up to about) 22 hours, or about (or up to about) 24 hours, or about (or up to about) 50 hours In some embodiments, they are artificially aged by heating to about 800° C. for about 16 hours.

In some embodiments, for the above-described comparisons, the thrifting (reduction) of platinum group metal for the catalytic converters made with substrates of the invention is compared with either 1) a commercially available catalytic converter, made using wet chemistry, for the application disclosed (e.g., for use on a gasoline engine or gasoline vehicle), or 2) a catalytic converter made with wet chemistry, which uses the minimal amount of platinum group metal to achieve the performance standard indicated, and after the coated substrate according to the invention and the catalytic substrate used in the commercially available catalyst or catalyst made using wet chemistry with the minimal amount of PGM to achieve the performance standard indicated are aged as described above.

In some embodiments, for the above-described catalytic converters employing the coated substrates of the invention, for the exhaust treatment systems using catalytic converters employing the coated substrates of the invention, and for vehicles employing these catalytic converters and exhaust treatment systems, the catalytic converter is employed as a diesel oxidation catalyst along with a diesel particulate filter, or the catalytic converter is employed as a diesel oxidation catalyst along with a diesel particulate filter and a selective catalytic reduction unit, to meet or exceed the standards for CO and/or $NO_R$, and/or HC described above.

Exemplary Embodiments

The invention is further described by the following embodiments.

Embodiment 1. In one embodiment, the invention provides a coated substrate comprising: oxidative catalytically active particles comprising oxidative composite nanoparticles bonded to first micron-sized carrier particles, wherein the oxidative composite nanoparticles comprise a first support nanoparticle and one or more oxidative catalyst nanoparticles; and reductive catalytically active particles comprising reductive composite nanoparticles bonded to second micron-sized carrier particles, wherein the reductive composite nanoparticles comprise a second support nanoparticle and one or more reductive catalyst nanoparticles.

Embodiment 2. In a further embodiment of embodiment 1, the coated substrate comprises at least two washcoat layers in which the oxidative catalytically active particles are in one washcoat layer and the reductive catalytically active particles are in another washcoat layer.

Embodiment 3. In a further embodiment of embodiment 1, the oxidative catalytically active particles and the reductive catalytically active particles are in the same washcoat layer.

Embodiment 4. In a further embodiment of any one of embodiments 1, 2, or 3, the oxidative catalyst nanoparticles comprise platinum, palladium, or a mixture thereof.

Embodiment 5. In a further embodiment of any one of embodiments 1, 2, or 3, the oxidative catalyst nanoparticles comprise palladium.

Embodiment 6. In a further embodiment of any one of embodiments 1-5, embodiments, the first support nanoparticles comprise aluminum oxide.

Embodiment 7. In a further embodiment of any one of embodiments 1-6, the first micron-sized carrier particles comprise aluminum oxide.

Embodiment 8. In a further embodiment of any one of embodiments 1-7, the first micron-sized carrier particle is pre-treated at a temperature range of about 700° C. to about 1500° C.

Embodiment 9. In a further embodiment of any one of embodiments 1-8, the reductive catalyst nanoparticles comprise rhodium.

Embodiment 10. In a further embodiment of any one of embodiments 1-9, the second support nanoparticles comprise cerium zirconium oxide.

Embodiment 11. In a further embodiment of any one of embodiments 1-10, the second micron-sized carrier particles comprise cerium zirconium oxide.

Embodiment 12. In a further embodiment of any one of embodiments 1-11, the support nanoparticles have an average diameter of 10 nm to 20 nm.

Embodiment 13. In a further embodiment of any one of embodiments 1-12, the catalytic nanoparticles have an average diameter of between 1 nm and 5 nm.

Embodiment 14. In a further embodiment of any one of embodiments 1-13, the embodiment further comprises an oxygen storage component.

Embodiment 15. In a further embodiment of embodiment 14, the oxygen storage component is cerium zirconium oxide or cerium oxide.

Embodiment 16. In a further embodiment of any one of embodiments 1-15, the embodiment further comprises a NOx absorber component.

Embodiment 17. In a further embodiment of embodiment 16, the NOx absorber is nano-sized BaO.

Embodiment 18. In a further embodiment of embodiment 16, the NOx absorber is micron-sized BaO.

Embodiment 19. In a further embodiment of any one of embodiments 1-18, the substrate comprises cordierite.

Embodiment 20. In a further embodiment of any one of embodiments 1-19, the substrate comprises a grid array structure.

Embodiment 21. In a further embodiment of any one of embodiments 1-20, the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 22. In a further embodiment of any one of embodiments 1-20, the coated substrate has a platinum group metal loading of 4 g/l or less and a light-off temperature for hydrocarbon at least 5° C. lower than the light-off temperature of a substrate with the same platinum group metal loading deposited by wet-chemistry methods.

Embodiment 23. In a further embodiment of any one of embodiments 1-20, the coated substrate has a platinum group metal loading of 4 g/l or less and a light-off temperature for nitrogen oxide at least 5° C. lower than the light-off temperature of a substrate with the same platinum group metal loading deposited by wet-chemistry methods.

Embodiment 24. In a further embodiment of any one of embodiments 1-23, the coated substrate has a platinum group metal loading of about 3.0 g/l to about 4.0 g/l.

Embodiment 25. In a further embodiment of any one of embodiments 1-24, the coated substrate has a platinum group metal loading of about 3.0 g/l to about 4.0 g/l, and after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 26. In a further embodiment of any one of embodiments 1-25, the ratio of oxidative catalytically active particles to reductive catalytically active particles is between 6:1 and 40:1.

Embodiment 27. A catalytic converter comprising a coated substrate of any of embodiments 1-26.

Embodiment 28. An exhaust treatment system comprising a conduit for exhaust gas and a catalytic converter comprising a coated substrate as in any one of embodiments 1-26.

Embodiment 29. A vehicle comprising a catalytic converter according to embodiment 27.

Embodiment 30. A method of treating an exhaust gas, comprising contacting the coated substrate as in any one of embodiments 1-26 with the exhaust gas.

Embodiment 31. A method of treating an exhaust gas, comprising contacting the coated substrate as in any one of embodiments 1-26 with the exhaust gas, wherein the substrate is housed within a catalytic converter configured to receive the exhaust gas.

Embodiment 32. In another embodiment, the invention provides a method of forming a coated substrate, the method comprising: a) coating a substrate with a washcoat composition comprising oxidative catalytically active particles; wherein the oxidative catalytically active particles comprise oxidative composite nanoparticles bonded to micron-sized carrier particles, and the oxidative composite nanoparticles comprise a first support nanoparticle and one or more oxidative catalyst nanoparticles; and b) coating the substrate with a washcoat composition comprising reductive catalytically active particles; wherein the reductive catalytically active particles comprise reductive composite nanoparticles bonded to micron-sized carrier particles, and the reductive composite nanoparticles comprise a second support nanoparticle and one or more reductive catalyst nanoparticles.

Embodiment 33. In another embodiment, the invention provides a method of forming a coated substrate, the method comprising: a) coating a substrate with a washcoat composition comprising oxidative catalytically active particles and reductive catalytically active particles; wherein the oxidative catalytically active particles comprise oxidative composite nanoparticles bonded to micron-sized carrier particles, and the oxidative composite nanoparticles comprise a first support nanoparticle and one or more oxidative catalyst nanoparticles; and the reductive catalytically active particles comprise reductive composite nanoparticles bonded to micron-sized carrier particles, and the reductive composite nanoparticles comprise a second support nanoparticle and one or more reductive catalyst nanoparticles.

Embodiment 34. In another embodiment, the invention provides a washcoat composition comprising a solids content of: 25-75% by weight of oxidative catalytic active particles comprising composite oxidative nano-particles bonded to micron-sized carrier particles, and the composite oxidative nano-particles comprise a support nano-particle and an oxidative catalytic nano-particle; 5-50% by weight of reductive catalytic active particles comprising composite reductive nano-particles bonded to micron-sized carrier particles, and the composite reductive nano-particles comprise a support nano-particle and a reductive catalytic nano-particle; 1-40% by weight of micron-sized cerium zirconium oxide; 0.5-10% by weight of boehmite; and 1-25% by weight micron-sized $Al_2O_3$.

EXPERIMENTAL SECTION

Comparison of Catalytic Converter Performance to Commercially Available Catalytic Converters The table below illustrates the performance of a coated substrate in a catalytic converter, where the coated substrate is prepared according to one embodiment of the present invention, compared to a commercially available catalytic converter having a substrate prepared using wet-chemistry methods. The coated substrates are artificially aged and tested.

TABLE 2

| | SDC Catalyst compared to Commercial Catalytic Converter at Same PGM Loadings | | | | | | |
|---|---|---|---|---|---|---|---|
| Catalytic converter | PGM loading (g/l) | $CO-T_{50}$ fresh | $CO-T_{50}$ aged | $HC-T_{50}$ fresh | $HC-T_{50}$ aged | $NO-T_{50}$ fresh | $NO-T_{50}$ aged |
| Commercial-Comparative Example 1 | 2.1 (14:1) | 164 | 224 | 172 | 227 | 165 | 220 |
| Example 2 | 2.1 (14:1) | 180 | 203 | 181 | 206 | 182 | 207 |

In Table 2, a study of catalysts was performed to compare a catalytic converter containing the coated substrate prepared according to one embodiment of the present invention with a commercial catalytic converter. The catalytic converters contained the same PGM loading. The ratios show the PGM loading and indicate the ratio of palladium to rhodium. The light off temperature ($T_{50}$) of carbon monoxide (CO), hydrocarbons (HC), and nitrogen oxide (NO) were measured and shown above. Based on the results in Table 2, a catalytic converter containing the coated substrate of Example 2, which was prepared according to the present invention, showed significantly better performance including lower light off temperatures after aging than the commercially available catalytic converter of Comparative Example 1 with the same loading of PGM.

TABLE 3

SDC Catalyst compared to Commercial Catalytic Converter

| Catalytic converter | PGM loading (g/l) | CO-$T_{50}$ fresh | CO-$T_{50}$ aged | HC-$T_{50}$ fresh | HC-$T_{50}$ aged | NO-$T_{50}$ fresh | NO-$T_{50}$ aged |
|---|---|---|---|---|---|---|---|
| Commercial-Comparative Example 3 | 2.1 (14:1) | 164 | 224 | 172 | 227 | 165 | 220 |
| Example 4 | 1.3 (14:1) | 200 | 222 | 201 | 225 | 203 | 222 |

In Table 3, a study of catalysts was performed to compare a catalytic converter containing the coated substrate prepared according to one embodiment of the present invention with a commercial catalytic converter. Example 4, which is a catalytic converter containing a coated substrate prepared according to one embodiment of the present invention contained a lower PGM loading than the commercially available catalytic converter of Comparative Example 3. The ratios shown the PGM loading indicate the ratio of palladium to rhodium. The light off temperature ($T_{50}$) of carbon monoxide (CO), hydrocarbons (HC), and nitrogen oxide (NO) were measured and shown above. Based on the results in Table 3, the catalytic converter of Example 4 prepared according to an embodiment of the present invention showed similar performance compared to the commercial catalytic converter of Comparative Example 3, which had a higher loading of PGM. This shows that the disclosed catalytic converters reduce the need for platinum group metals.

Comparison of Catalytic Converter Performance Described Herein to Commercially Available Catalytic Converters Table 4 shows a comparison of certain properties of a catalyst prepared according to the present invention ("SDC-materials Catalyst") versus a commercially available catalytic converter having a substrate prepared using wet-chemistry methods ("Commercial TWC Catalyst" or "Comm. Catalyst"). The coated substrates are artificially aged and tested in a fashion as described above. The catalyst prepared according to the present invention demonstrated lower light-off temperatures (50% conversion temperatures) for carbon monoxide (CO) (36° C. lower), hydrocarbons (HC) (40° C. lower), and nitric oxide (NO) (11° C. lower). The catalyst prepared according to the present invention demonstrated also displayed about 2.2 times the oxygen storage capacity of the catalytic converter prepared via wet chemistry methods.

TABLE 4

SDC Catalyst compared to Commercial Catalytic Converter: Lightoff, Oxygen Storage

| | PGM Loading | Aged CO-$T_{50}$ Light Temp. in ° C. | Aged HC-$T_{50}$ Light Temp. in ° C. | Aged NO-$T_{50}$ Light Temp. in ° C. | Oxygen Storage Capacity |
|---|---|---|---|---|---|
| Commercial TWC Catalyst | 100% | x° C. | y° C. | z° C. | 1 |
| SDC materials Catalyst | 66% (of Comm. Catalyst) | x° C.-36° C. | y° C.-40° C. | z° C.-11° C. | 2.2x of Comm. Catalyst |

The following description is presented to enable one of ordinary skill in the art to make and use the invention and is provided in the context of a patent application and its requirements. Various modifications to the described embodiments will be readily apparent to those persons skilled in the art and the generic principles herein may be applied to other embodiments. Thus, the present invention is not intended to be limited to the embodiment shown but is to be accorded the widest scope consistent with the principles and features described herein. Finally, the entire disclosure of the patents and publications referred in this application are hereby incorporated herein by reference.

What is claimed is:

1. A coated substrate comprising:
   oxidative catalytically active particles comprising oxidative composite nanoparticles bonded to first micron-sized carrier particles comprising metal oxide, wherein the oxidative composite nanoparticles comprise a first support nanoparticle comprising metal oxide and one or more oxidative catalyst nanoparticles comprising a first platinum group metal; and
   reductive catalytically active particles comprising reductive composite nanoparticles bonded to second micron-sized carrier particles comprising metal oxide, wherein the reductive composite nanoparticles comprise a second support nanoparticle comprising metal oxide and one or more reductive catalyst nanoparticles comprising a second platinum group metal.

2. The coated substrate of claim 1, wherein the coated substrate comprises at least two washcoat layers in which the oxidative catalytically active particles are in one washcoat layer and the reductive catalytically active particles are in another washcoat layer.

3. The coated substrate of claim 1, wherein the oxidative catalytically active particles and the reductive catalytically active particles are in the same washcoat layer.

4. The coated substrate of claim 1, wherein the oxidative catalyst nanoparticles comprise platinum, palladium, or a mixture thereof.

5. The coated substrate of claim 4, wherein the oxidative catalyst nanoparticles comprise palladium.

6. The coated substrate of claim 1, wherein the first support nanoparticles comprise aluminum oxide.

7. The coated substrate of claim 1, wherein the first micron-sized carrier particles comprise aluminum oxide.

8. The coated substrate of claim 1, wherein the first micron-sized carrier particle is pre-treated at a temperature range of about 700° C. to about 1500° C.

9. The coated substrate of claim 1, wherein the reductive catalyst nanoparticles comprise rhodium.

10. The coated substrate of claim 1, wherein the second support nanoparticles comprise cerium zirconium oxide.

11. The coated substrate of claim 1, wherein the second micron-sized carrier particles comprise cerium zirconium oxide.

12. The coated substrate of claim 1, wherein the support nanoparticles have an average diameter of 10 nm to 20 nm.

13. The coated substrate of claim 1, wherein the catalytic nanoparticles have an average diameter of between 1 nm and 5 nm.

14. The coated substrate of claim 1, further comprising an oxygen storage component.

15. The coated substrate of claim 14, wherein the oxygen storage component is cerium zirconium oxide or cerium oxide.

16. The coated substrate of claim 1, further comprising a NOx absorber component.

17. The coated substrate of claim 16, wherein the NOx absorber is nano-sized BaO.

18. The coated substrate of claim 16, wherein the NOx absorber is micron-sized BaO.

19. The coated substrate of claim 1, wherein the substrate comprises cordierite.

20. The coated substrate of claim 1, wherein the substrate comprises a grid array structure.

21. The coated substrate of claim 1, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

22. The coated substrate of claim 1, wherein the coated substrate has a platinum group metal loading of 4 g/l or less and a light-off temperature for hydrocarbon at least 5° C. lower than the light-off temperature of a substrate with the same platinum group metal loading deposited by wet-chemistry methods.

23. The coated substrate of claim 1, wherein the coated substrate has a platinum group metal loading of 4 g/l or less and a light-off temperature for nitrogen oxide at least 5° C. lower than the light-off temperature of a substrate with the same platinum group metal loading deposited by wet-chemistry methods.

24. The coated substrate of claim 1, wherein the coated substrate has a platinum group metal loading of about 3.0 g/l to about 4.0 g/l.

25. The coated substrate of claim 1, wherein said coated substrate has a platinum group metal loading of about 3.0 g/l to about 4.0 g/l, and after 125,000 miles of operation in a vehicular catalytic converter, the coated substrate has a light-off temperature for carbon monoxide at least 5 ° C. lower than a coated substrate prepared by depositing platinum group metals by wet chemical methods having the same platinum group metal loading after 125,000 miles of operation in a vehicular catalytic converter.

26. The coated substrate of claim 1, wherein a ratio of oxidative catalytically active particles to reductive catalytically active particles is between 6:1 and 40:1.

27. A catalytic converter comprising a coated substrate of claim 1.

28. A vehicle comprising a catalytic converter according to claim 27.

29. An exhaust treatment system comprising a conduit for exhaust gas and a catalytic converter comprising a coated substrate of claim 1.

30. A method of treating an exhaust gas, comprising contacting the coated substrate of claim 1 with the exhaust gas.

31. A method of treating an exhaust gas, comprising contacting the coated substrate of claim 1 with the exhaust gas, wherein the substrate is housed within a catalytic converter configured to receive the exhaust gas.

32. A washcoat composition comprising a solids content of:
- 25-75% by weight of oxidative catalytic active particles comprising composite oxidative nano-particles bonded to micron-sized carrier particles, and the composite oxidative nano-particles comprise a support nano-particle and an oxidative catalytic nano-particle;
- 5-50% by weight of reductive catalytic active particles comprising composite reductive nano-particles bonded to micron-sized carrier particles, and the composite reductive nano-particles comprise a support nano-particle and a reductive catalytic nano-particle;
- 1-40% by weight of micron-sized cerium zirconium oxide;
- 0.5-10% by weight of boehmite; and
- 1-25% by weight micron-sized $Al_2O_3$.

* * * * *